(12) United States Patent
Chelarescu et al.

(10) Patent No.: US 11,232,206 B2
(45) Date of Patent: Jan. 25, 2022

(54) AUTOMATED MALWARE REMEDIATION AND FILE RESTORATION MANAGEMENT

(71) Applicant: MICROSOFT TECHNOLOGY LICENSING, LLC, Redmond, WA (US)

(72) Inventors: Filip Chelarescu, Kirkland, WA (US); Steven J. Bailey, Bellevue, WA (US); John David Rodrigues, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 16/391,589

(22) Filed: Apr. 23, 2019

(65) Prior Publication Data
US 2020/0342106 A1 Oct. 29, 2020

(51) Int. Cl.
*G06F 21/56* (2013.01)
(52) U.S. Cl.
CPC .......... *G06F 21/568* (2013.01); *G06F 21/565* (2013.01); *G06F 21/567* (2013.01); *G06F 2221/033* (2013.01)
(58) Field of Classification Search
CPC .... G06F 21/568; G06F 21/565; G06F 21/567; G06F 2221/033
See application file for complete search history.

(56) References Cited

U.S. PATENT DOCUMENTS

| | | | |
|---|---|---|---|
| 6,880,110 B2 | 4/2005 | Largman et al. | |
| 7,107,618 B1 | 9/2006 | Gordon et al. | |
| 8,661,547 B1 * | 2/2014 | Kononov | H04L 63/1408 726/24 |
| 8,707,427 B2 | 4/2014 | Hooks et al. | |
| 8,839,234 B1 | 9/2014 | Deshevykh et al. | |
| 9,825,988 B2 | 11/2017 | Crawford | |
| 10,079,852 B2 | 9/2018 | Xie et al. | |

(Continued)

FOREIGN PATENT DOCUMENTS

| | | |
|---|---|---|
| KR | 20150102866 A | 9/2015 |
| WO | 2008005536 A2 | 1/2008 |

(Continued)

OTHER PUBLICATIONS

"International Search Report and Written Opinion Issued in PCT Application No. PCT/US2020/025576", dated May 28, 2020, 10 Pages.

(Continued)

*Primary Examiner* — Christopher C Harris
(74) *Attorney, Agent, or Firm* — NovoTechIP International PLLC

(57) ABSTRACT

A system and method for providing automated service-based malware remediation. When a computing device is attacked by malware such as ransomware, multiple manual steps are usually needed to fully remediate the device. Users are typically required to follow several steps to remove the ransomware, and potentially must engage in the challenging task of reimaging the impacted device as well as choosing a restore point for point-in-time recovery. The disclosed systems provide a mechanism by which a cloud-based service manages a fully automated remediation and file recovery process for the user.

20 Claims, 17 Drawing Sheets

(56) References Cited

U.S. PATENT DOCUMENTS

| | | |
|---|---|---|
| 10,911,415 B1 | 2/2021 | Feeser et al. |
| 11,003,770 B2 | 5/2021 | Toley et al. |
| 2002/0138760 A1 | 9/2002 | Naitoh |
| 2004/0209608 A1 | 10/2004 | Kouznetsov et al. |
| 2007/0240222 A1 | 10/2007 | Tuvell et al. |
| 2009/0019547 A1 | 1/2009 | Palliyil et al. |
| 2010/0031361 A1* | 2/2010 | Shukla .................. G06F 21/567 726/24 |
| 2010/0132042 A1 | 5/2010 | Zhang |
| 2010/0257609 A1* | 10/2010 | Niemela .................. G06F 21/56 726/24 |
| 2013/0061325 A1* | 3/2013 | Singh ...................... G06F 21/56 726/24 |
| 2013/0074181 A1 | 3/2013 | Singh |
| 2014/0013434 A1 | 1/2014 | Ranum et al. |
| 2014/0130161 A1* | 5/2014 | Golovanov ......... H04L 63/1416 726/23 |
| 2014/0289853 A1* | 9/2014 | Teddy ................ H04L 63/145 726/23 |
| 2014/0379637 A1* | 12/2014 | Seinfeld ................ G06F 21/568 707/610 |
| 2015/0007324 A1 | 1/2015 | Ngair |
| 2016/0164894 A1 | 6/2016 | Zeitlin et al. |
| 2017/0111388 A1 | 4/2017 | Mehta et al. |
| 2017/0177867 A1* | 6/2017 | Crofton ................. G06F 21/565 |
| 2017/0255777 A1 | 9/2017 | Ford |
| 2017/0324756 A1 | 11/2017 | Adams et al. |
| 2018/0024893 A1* | 1/2018 | Sella ...................... G06N 7/005 707/648 |
| 2018/0034835 A1 | 2/2018 | Iwanir et al. |
| 2018/0204000 A1 | 7/2018 | Charters et al. |
| 2018/0330088 A1 | 11/2018 | Crofton et al. |
| 2019/0138727 A1* | 5/2019 | Dontov ................. G06F 21/554 |
| 2020/0342105 A1 | 10/2020 | Abergel et al. |

FOREIGN PATENT DOCUMENTS

| | | |
|---|---|---|
| WO | 2018020362 A1 | 2/2018 |
| WO | 2018125396 A1 | 7/2018 |
| WO | 2018130904 A1 | 7/2018 |

OTHER PUBLICATIONS

Webster, et al., "Fast and Service-Preserving Recovery from Malware Infections Using CRIU", In Proceedings of 27th USENIX Security Symposium, Aug. 15, 2018, pp. 1198-1211.

"International Search Report & Written Opinion Issued in PCT Application No. PCT/US20/025580", dated Jun. 9, 2020, 9 Pages.

"Non Final Office Action Issued in U.S. Appl. No. 16/391,513", Mailed Date : Mar. 18, 2021, 23 Pages.

"Notice of Allowance Issued in U.S. Appl. No. 16/391,513", dated Sep. 30, 2021, 17 Pages.

* cited by examiner

AUTOMATED MALWARE REMEDIATION AND FILE RESTORATION MANAGEMENT

CROSS-REFERENCE TO RELATED APPLICATION

This application is related to co-pending U.S. patent application Ser. No. 16/391,513, filed Apr. 23, 2019, titled "File Storage Service Initiation of Antivirus Software Locally Installed on a User Device," the entirety of which is herein incorporated by reference.

BACKGROUND

Cloud storage accounts allow users to store their electronic content items or files in an online storage account that can be accessed from any computing device with a network connection. Some more well-known examples of cloud storage service providers include Microsoft OneDrive®, Google Drive®, DropBox®, and Box®. Through these types of services, users can upload content items such as pictures, songs, documents, and other electronic content from a computing device to an online storage account. These items can later be accessed from different computing devices. In some cases, such as Microsoft's OneDrive®, the service offers a means of storing, syncing, and sharing a wide variety of file types with other people and across multiple computing devices, as well as the possibility of synchronizing system settings, visual customizations, themes, app settings and browser tabs, history and saved passwords for different devices.

As more and more computers have become interconnected through various networks, attacks delivered over a network have also increased, and computer security is of utmost significance. Such malware attacks can occur in the form of computer viruses, computer worms, ransomware, system component replacements, spyware, adware, denial of service attacks, and other invasive attacks that exploit one or more computer system vulnerabilities for illegitimate purposes. In particular, ransomware is a malware that is has been increasingly targeting cloud storage.

Unfortunately, even with cloud storage backup, users continue to find that their digital content items remain vulnerable to attacks by malware. Addressing these attacks can be time consuming and challenging for users. Traditional remediation methods require a series of multiple manual steps by the user that, in many cases, a user may have difficulty completing. Thus, there remain significant areas for new and improved ideas for securing digital content, reducing the impact of malware, and providing users with tools for the improved management of device infections.

SUMMARY

An automated remediation and restoration system, in accord with a first aspect of this disclosure, includes a processor and computer readable media including instructions which, when executed by the processor, cause the processor to receive, at a remote cloud service, from a first client device over a communication network during a synchronization session, synchronization data for a first file indicating that a first client device is associated with a likelihood of infection by malware. The instructions also cause the processor to determine, at the remote cloud service, in response to receiving the synchronization data, that the first client device has been infected by malware, and to automatically invoke an antivirus service for remediation of the first client device in response to the determination that the first device has been infected, the first device being registered with the antivirus service. In addition, the instructions cause the processor to confirm, at the remote cloud service, that the remediation of the first client device has successfully concluded, and determine an initial infection time, based on a review of a synchronization history of the first file, when an infected version of the first file was initially submitted for synchronization with the remote cloud service. The instructions also cause the processor to automatically restore the first file on the client device by identifying (at the remote cloud service) a first version of the first file synced prior to the initial infection time and replacing the infected version with the first version.

A method, in accord with a second aspect of this disclosure, includes receiving, at a remote cloud service, from a first client device over a communication network during a synchronization session, synchronization data for a first file indicating that a first client device is associated with a likelihood of infection by malware. The method also includes determining, at the remote cloud service, in response to receiving the synchronization data, that the first client device has been infected by malware, and then automatically invoking an antivirus service for remediation of the first client device in response to the determination that the first device has been infected, the first device being registered with the antivirus service. The method further includes confirming, at the remote cloud service, that the remediation of the first client device has successfully concluded. In addition, the method includes determining an initial infection time, based on a review of a synchronization history of the first file, when an infected version of the first file was initially submitted for synchronization with the remote cloud service. Finally, the method can include automatically restoring the first file on the client device by identifying (at the remote cloud service) a first version of the first file synced prior to the initial infection time and replacing the infected version with the first version.

A computer readable medium, in accord with a third aspect of this disclosure, includes instructions stored therein which, when executed by a processor, cause the processor to perform operations that include receiving, at a remote cloud service, from a first client device over a communication network during a synchronization session, synchronization data for a first file indicating that a first client device is associated with a likelihood of infection by malware. In addition, the instructions cause the processor to determine, at the remote cloud service, in response to receiving the synchronization data, that the first client device has been infected by malware, and then automatically invoke an antivirus service for remediation of the first client device in response to the determination that the first device has been infected, the first device being registered with the antivirus service. Furthermore, the instructions cause the processor to confirm, at the remote cloud service, that the remediation of the first client device has successfully concluded. The instructions also cause the processor to determine an initial infection time, based on a review of a synchronization history of the first file, when an infected version of the first file was initially submitted for synchronization with the remote cloud service, and automatically restore the first file on the client device by identifying (at the remote cloud service) a first version of the first file synced prior to the initial infection time and replacing the infected version with the first version.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
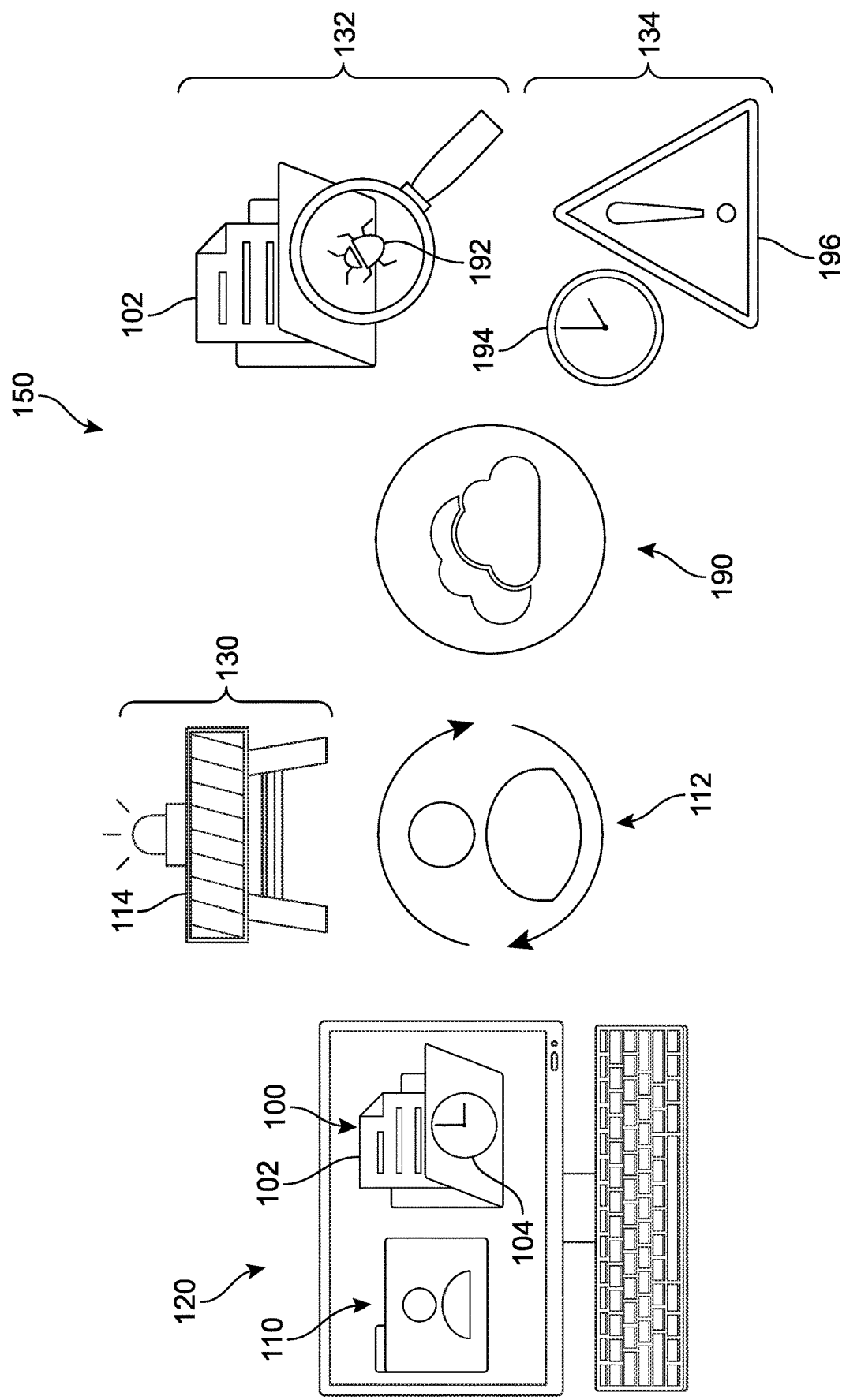
FIGS. 1A and 1B are a conceptual illustration of an implementation of an automated remediation and restoration.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following description discloses systems and methods for remediation following infection of electronic content items and computing devices by malware. The user account(s) affected by the attack are associated with an online or cloud-based storage system that hosts and synchronizes files for that user account. A content management system is configured to receive information about the electronic content items and verify whether one or more of the items have been potentially targeted or corrupted by malware. If the user account has opted-in or otherwise enabled an automated remediation service, the system can remotely determine if the client device includes an antivirus program and then automatically execute the antivirus program to remove the malware. The remediation of the device becomes a fully automated process initiated by a remote service, and can provide for both recovery of the impacted device as well as restoration of infected files. Such proactive remediation measures can reduce potential data loss conditions, free users from the burdens of device repair and file corruption, and help minimize the possibility of incomplete or erroneous attempts at malware removal.

For purposes of reference, a content management system (CMS) refers to a cloud-based system by which a user can store content items, as well as perform a variety of content management tasks, such as retrieve, modify, browse, and/or share the content items, and enable a user to access the content from multiple client devices. Generally, a user can interact with a CMS through one or more client devices that are connected to a network. A CMS can support connections from a variety of different client devices, such as desktop computers, mobile computers, mobile communications devices (such as mobile phones, smart phones, tablets, etc.), smart televisions, gaming devices, set-top boxes, and/or any other network enabled computing devices. A CMS can be configured to accept connections from and interact with multiple client devices concurrently. Typically, a user engages with a CMS through interaction with a client-side application that is installed on the client's device, or via a third-party application, such as a web-browser application, and is configured to communicate with the CMS.

Furthermore, as a general matter, the terms "electronic content item" or "content item" include any digital data that may be presented (e.g., visually or audibly presented), including but not limited to an electronic document, a media stream, a web page, a hypertext document, an image, digital video or a video recording, digital audio or an audio recording, animation, a digital message, a markup language document, such as a HyperText Markup Language (HTML) or eXtensible Markup Language (XML) document, a form having blank components to accept entered data, or data describing the application of a GUI, and other digital data. In addition, "items" as used herein can include any folder, file, directory, or data object on an electronic device. As one example, items can refer to directory "folders" that can include documents, photos, music files, and video files.

Furthermore, the terms "software application", "software", or "application" may refer to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software. Specific references to a software application by name throughout this description should not therefore be understood to limit the use of the proposed systems and methods.

In addition, synchronization can refer to the uploading of content items from a client device over a communication network to a CMS or, alternatively, downloading of content items from the content management system to the client device over a communication network, to result in synchronized content libraries on both the client device and the content management system. It should be understood that for purposes of simplicity, the examples described herein will present situations in which an upload is occurring. However, all references to "upload" and examples of upload-based synchronizations presented in the following description should be understood to also encompass situations in which the synchronization event involves a download of electronic content. For example, the client device can be configured to synchronize content items stored on the client device with an associated account on the CMS by uploading the content items stored on the client device to a linked content management system. The client device can also be configured to synchronize content items by downloading of the content items stored on a linked content management system to the client device.

The following implementations describe a method for monitoring and remediating client devices, corresponding operating systems and core components, and digital content associated with the device, from malware. As a general matter, malware refers to software that has been designed specifically to damage or disrupt a system (e.g., malicious software or "malware"), and compromises the integrity of the computer's operating system. On a day-to-day basis, operating systems are designed to provide infrastructure for hosting processes and providing system services to those processes. These operating systems usually provide basic security protections, including enforcement of access control and ownership rights over system resources. Some typical protective security services come in the form of a host firewall, vulnerability assessment, patch detection, behavioral blocking, host or network intrusion detection, and antivirus technologies. These services are run as native applications in the operating system. However, despite these measures, the device operating system is sometimes unable to accurately determine whether it has been attacked or the time needed to diagnose such an attack is prolonged. As one example, once a form of malicious code or other malware attacks a computer system and gains a requisite level of control (e.g., administrator-level access), all further attempts by the operating system to determine whether it is under attack are no longer trustworthy, as the mechanisms for such attempts may also be corrupted.

Protecting a computer system and its operating system from such damage involves further installation of security applications, such as antivirus software, personal firewalls, and intrusion detection systems. Even in systems that comprise multiple computer systems, such as a computer network or a cluster of computer systems deployed in an array, each individual computer system will run its own set of security applications. Generally, this is due to each computer system in the network or array being a physically separate entity with its own network attachment, its own central processing unit(s), and its own instance of an operating system. These types of security applications may be installed on each computer system with the aim of preventing the device and its operating system from being compromised. However, such security applications may fail to protect the computer system as well, in part because—like the other applications running on the computer system—they are also vulnerable to attack.

In particular, ransomware is becoming increasingly sophisticated and disrupting to end-users. Ransomware is malware that infects devices and denies user access to computer files or data on the device. A "ransom" payment is typically requested in return for allowing the access to his or her computer files or data. For example, ransomware may be used to encrypt the computer files or data. A key for decrypting the files or data is sent after the ransom payment is received. Ransomware may be installed on computers via Trojan horses, which are malware files that are disguised as legitimate files, data or programs. Ransomware can also be embedded in email attachments and pictures. One type of ransomware ("Locker") encrypts the whole hard drive of the computer, essentially locking the user out of the entire system, while another type ("Crypto") will only encrypt specific, seemingly important files on the computer, such as word documents, PDFs and image files. Such ransomware is constantly evolving, leading to increased damage to client files and stress to end-users. It should be understood that while the following disclosure may make reference to a specific type of malware (such as ransomware) for purposes of the below examples, its benefits are not limited to such, and can be implemented for diagnosis and treatment of a wide range of malware types.

It should further be understood that the following disclosure is applicable to all types of antivirus, antispyware, and other anti-malware applications locally installed on client device that aim to protect devices by identifying harmful applications or other executable code and/or removing or at least neutralizing the harmful code. As will be discussed in greater detail below, in order to reduce the impact of malware on client devices, in different implementations, a CMS can offer or execute an automated remediation and restoration service (RRS) for user accounts that have opted-in for the service. The RRS can be configured to automatically detect if malware has attacked files. In response, the RRS can remotely execute the local instance of antivirus software, as well as coordinate with the client device to return the impacted files to a pre-attack or pre-infected state. The RRS can be configured to operate as an extension of an existing CMS or as an agent extender component that executes on a client device.

In some embodiments, the RRS monitors changes to user files by scanning synchronized files. When a change to a file is detected, the system can determine whether the file was maliciously changed (e.g., deleted, encrypted, or otherwise corrupted). Such a determination can occur based on many factors, including but not limited to criteria such as (a) entropy changes, (b) heuristics, (c) sudden changes in user behavior (e.g., behavior analysis), and (d) changes in honeypot files or directories on the files stored on the storage of the cloud provider or on the storage of a client device. In some embodiments, the system may use data analytics to help distinguish between legitimate changes and malicious changes. Various machine-learning techniques, such as a support vector machine, a Bayesian network, learning regression, a neural network, big data analytics, an evolutionary algorithm, and other may also be applied. Various file properties, such as the number and frequency of file changes, the location of file changes, the patterns of the changes (file extensions, file headers, entropy changes, file types), user information (e.g., organization or location), and others can be collected to aid in the detection process.

Figure 1B:
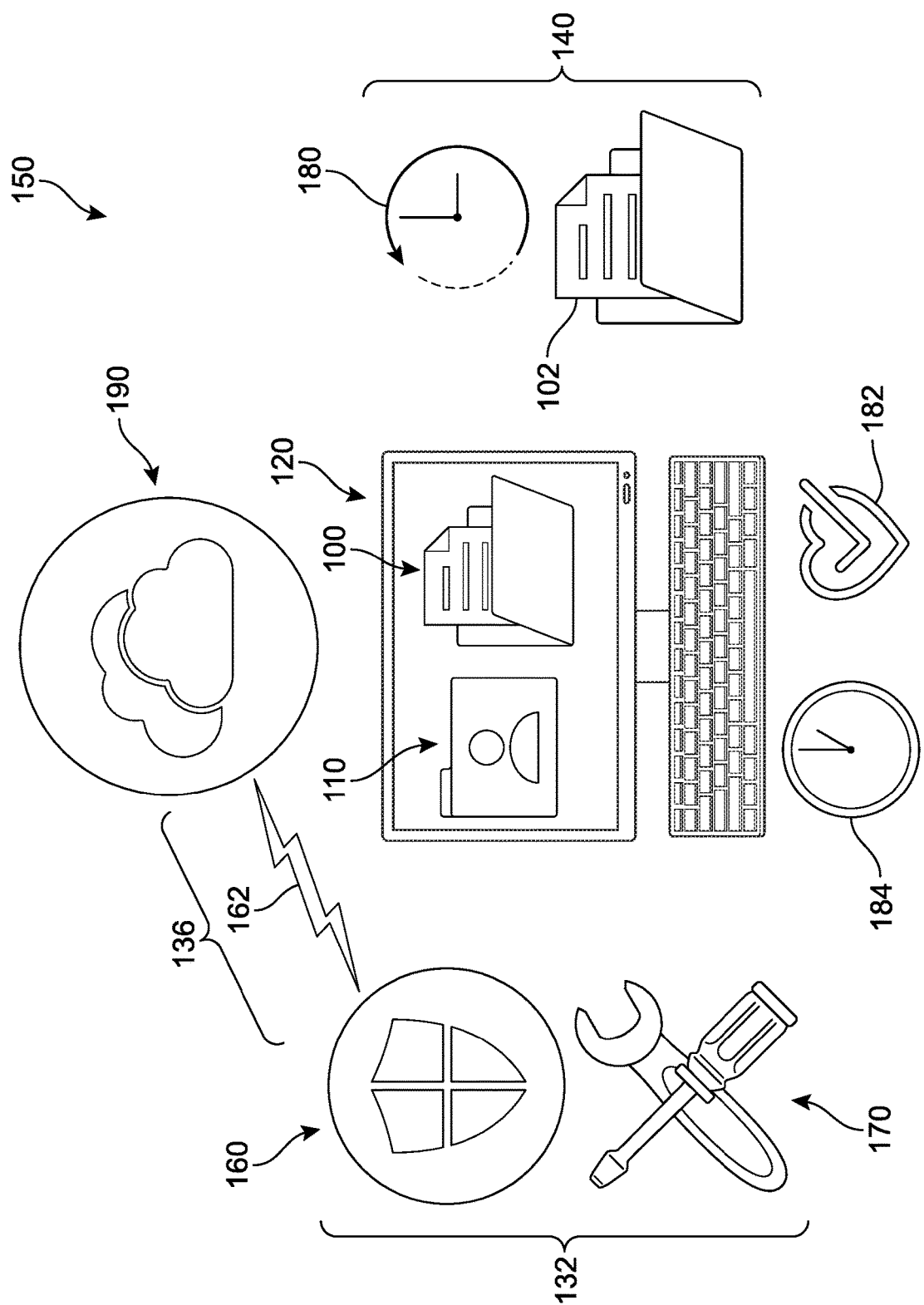
Figure 2:
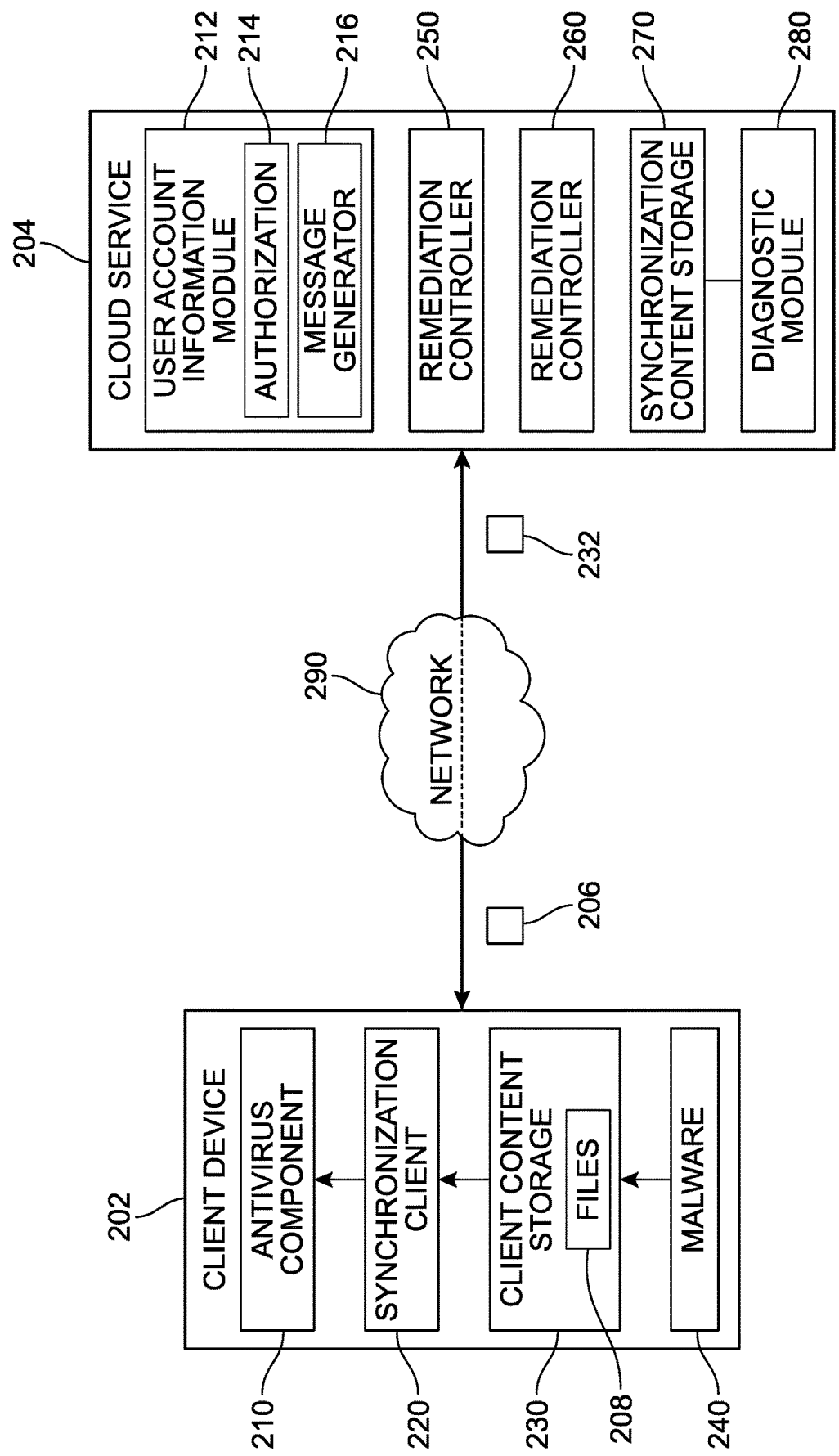
FIG. 2 is a diagram illustrating an implementation of a remediation and restoration management architecture.

In order to better introduce the systems and methods to the reader, FIGS. 1A and 1B present a high-level example of a representative computing environment ("environment") 150 for implementing a malware remediation and restoration management system ("system", also illustrated schematically in FIG. 2). In different implementations, the environment 150 can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user account ("first user") 110 is accessing or otherwise sharing data with a synchronization client application ("synchronization client") 100 on a first device 120. The first device 120 may be a personal computer such as a desktop or laptop computer, a mobile device, or any other computer system having a file system. The first device 120 executes an operating system such as Microsoft Windows®, Mac OS®, Unix®, or other operating system, and includes memory, storage, a network interface, and other computer hardware not illustrated in FIG. 1A for clarity. The first device 120 creates, modifies, and/or deletes files on its storage system via its operating system, with the modifications that will be described herein. In addition, the first device 120 includes one or more synchronized folders. In FIG. 1A, only one device is shown, but any number of devices may be sharing synchronized folders via the synchronization service. For example, the first device 120 can be connected to a server, or an online or cloud-based storage and computing service ("cloud storage service") 190 such as a CMS. As the first user 110 adds or modifies electronic content via first device 120, various content or files may be updated or saved in the cloud storage through a network connection.

Thus, the first device 120 allows the first user 110 to create, modify, and delete files on the client's local file system, and the CMS—via synchronization client 100—allows those actions to be synchronized with versions of the same files on a host system and/or on one or more other client computers. In some implementations, the user may create a folder and designate it for synchronization. The file's contents are managed in part by synchronization client 100 to maintain the desired frequency or level of synchronization. Generally, users can create a shared synchronized folder either through a native control for synchronization client 100, or via a web server, which can present a user interface for end-users to identify files that are to be synced or adjust user settings, etc.

In general, an "interface" can be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application. Selectable or actuatable options or buttons are configured to receive user inputs and trigger such actuation events.

In addition, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

In the example of FIG. 1A, the synchronization client 100 can provide a UI that is configured to permit the first user 110 to select or authorize a folder or content to be shared with the cloud storage service 190. The first device 120 can then upload or synchronize one or more electronic content available in memory components associated with the first device 120. For purposes of simplicity, the electronic content set includes a first electronic content item ("first item") 102, though in most cases there will be multiple electronic content items queued for synchronization. The first item 102 can be associated with a synchronization folder made available through the synchronization client 100 on first device 120. In some implementations, the operating system can send a message to indicate a change has occurred to the synchronized folder, as well as the location (path) of the folder or file within the folder where the change has occurred. As the folder is synchronized, data associated with each item is transmitted to the cloud storage service 190.

As will be discussed in greater detail below, as the first user account is synchronized or otherwise shares data with the cloud storage service 190 at a first time 104 (approximately 3:00 PM) during a sync account session 112, there may be various indications that one or more items or files has 'symptoms' or a likelihood of being affected or impacted by malware. In some implementations, the cloud storage service 190 may be configured to detect such indications during or soon after synchronization occurs. For example, the cloud storage service 190 may receive from the first device synchronization data for one or more files indicating that the first device is associated with a likelihood of infection by malware.

In FIG. 1A, such a detection has occurred, represented by alert trigger 114. In other words, the system, in a first stage 130, has determined that one or more files from the most recent sync account session 112 are potentially reflecting damage indicative of a device infection by malware. In different implementations, the system can proceed with verification of the infection in a second stage 132, where a more thorough review of the user account and associated files can occur. In one example, the system can determine that a malware 192 has attacked first device 120 (i.e., there is confirmation or verification of the infection) based on damage to one or more of the files (here, to first item 102) that was synced via a synchronization client installed on the first device 120

In such cases, the system can attempt to approximately determine when the infection initially occurred, and the extent of the infection, represented as a third stage 134. This determination can be based on a wide array of factors. In this case, the system determines that a device infection 196 began with files synchronized at or after 2:00 PM (see a second time 194), coincident to a sync session that occurred approximately one hour before the most recent (current) synchronization session. In different implementations, based on some or all of this information, the system can initiate an automated remediation.

Referring now to FIG. 1B, the cloud storage service 190 can communicate or transmit instructions or a request 162 to an antivirus service 160 at a fourth stage 136 to begin or perform a device remediation process. It may be understood that the antivirus service 160 is installed on or is otherwise registered with first user account 110 at the time of the repair. Thus, in different implementations, the system can include provisions for remotely and automatically activating or executing software or services associated with the local first device 120. In some implementations, it can be understood that this process will occur only in those cases where consent or authorization was obtained from the first user account 110 (either immediately before each execution event, or as a general consent obtained at an earlier time that applies to all or most future infection determinations). Once the antivirus service 160 receives the request 162, a fifth stage 138 in which the first device 120 is repaired and cleansed of malware via the antivirus service 160 occurs. This remediation session 170 can include, for example, the removal of malware (such as ransomware) from the impacted device, and/or potentially reimaging the impacted device. In some implementations, the system can automatically extend its remediation session 170 to multiple devices associated with the first user account 110, if other devices are found to store the damaged file(s), not just the first device 110 from which the infection was first identified, thereby ensuring that the user account as a whole is secured. In some implementations, this can occur simultaneously (i.e., the plurality of infected devices for this user account can undergo automatic remediation at approximately the same time), in a sequence (i.e., each infected device for this user account can undergo automated remediation one after another), or the end-user can select for each device what times are acceptable for performance of any automatic remediations.

Once the first device 110 is remediated, in some implementations, the system can proceed with initiation of an automated recovery of impacted files. For example, in a fifth stage 140, first item 102 is reverted back to a version of the first item 102 that existed in a point in time (see a rollback cycle 180) where no infection had yet occurred (as was determined during third stage 134 in FIG. 1A). In other words, for purposes of this example, the system can return or restore the impacted files from the damaged state or condition as reflected at 3:00 PM to a pre-infected state that existed as of 2:00 PM (see a restoration point 184). This restoration can occur with respect to files stored in the cloud storage service and/or the files that are stored in the first device.

It may be appreciated that, in many situations, the average user is unaware of events that have led to a malware attack on their device or files. As a result, the user may engage in behavior that exacerbates or otherwise hinders the security of their own account. Similarly, in cases where the user becomes aware of a problem, he or she may attempt to initiate a recovery and remediation but struggle with the multitude of carefully ordered manual steps required to successfully and entirely complete the malware removal. Oftentimes, the user may initiate or complete some of the tasks to the extent needed to continue working normally, but remain unaware of a continued malware presence on their device. In another example, the user may believe they have thoroughly cleansed the device, but have in reality failed to perform some action that is necessary for the completion of the remediation, and subsequently discover that the device had remained unsecure. As a general matter, an automated remediation session will refer to the implementation of a remotely triggered or initiated remediation of one or more user devices. While in some implementations the user may be notified or messaged regarding the diagnosis and recommended actions prior to the remediation, and/or be asked to provide a user input to the system before remediation begins, the overall processes described herein are configured to occur in a substantially automated manner, whereby the user can either continue working at their device and—if desired—monitor progress of the repair and restoration, or simply step away from the device while the remediation and restoration sessions take place.

In other words, following a determination that a device has been infected, the system can automatically take steps to protect the user account by quickly initiating repair of the affected device(s) as well as restoration of infected files. In order to provide further context for the uses and applications of the systems described herein, FIG. 2 presents a non-limiting example of an automated remediation and restoration system ("system") 200 that operate in conjunction with or in association with a cloud service 204 and a synchronization client 220. In different implementations, one or more files of a synchronization upload set (or download set) can include characteristics, attributes, or parameters that can be used by the system to determine whether the file reflects infection to the client device. As a general matter, a "synchronization content set" will be used to refer to content items that are queued for synchronization in a pending synchronization session. The session can be initiated automatically at predetermined intervals or following particular triggering events or can be manually initiated by a user, and can encompass one file, one folder, or a plurality of folders or directories. In addition, a 'queue' refers to the sequence of previous versions for a particular file generated following multiple sync events with the cloud service.

In FIG. 2, the synchronization client 220 is configured to monitor synchronization progress and transmit synchronization content messages to the synchronization server system is installed or otherwise associated with a client device 202. The synchronization client 220 generally includes or accesses synchronization item identification module, which is configured to, among other things, identify one or more new sync items to be synchronized from the synchronization client 220 to the synchronization file storage 270 associated with cloud service 204. For example, in response to a digital content item being created or modified, a respective new sync item 206 can be generated and provided to a pending synchronization items module for transmission to the cloud service. The new sync items can be added to a pending sync item queue in some implementations. The pending sync item queue may be configured to determine an order for synchronizing pending sync items; for example, the pending sync item queue may be configured to select a next sync item from the pending sync items. Further information regarding features, modules, and services associated with the synchronization process can be found in U.S. patent application Ser. No. 16/036,874 to Barreto, et al., filed on Jul. 16, 2018 and entitled "Long Upload Time Detection and Management" the disclosure of which is herein incorporated by reference in its entirety.

In some implementations, the synchronization client 220 includes a data transfer module configured to retrieve sync items from the pending item queue, obtain data from a client content storage 230 for corresponding portions of content items (e.g., files) 208, and transfer the data in upstream content item data messages 206 to the cloud service or server system 204 via network(s) 290. In different implementations, malware 240 may attack a client device 202 and, in some implementations, as shown in FIG. 2, the malware 240 can cause damage to files 208 stored in client content storage 230. These files 208 when next synced via the synchronization client 220 with the synchronization file storage 270, can be reviewed by a diagnostic module 280, which can determine whether the symptoms or indications of damage are actual reflections of a device infection.

In general, the cloud service 202 is configured to receive content data (e.g., files) for storage in a synchronization content storage 454. The server content storage may implement versioning to preserve previous versions of modified or deleted user content items. In some implementations, the cloud service 204 is configured to maintain a sync history, as will be discussed further below. The sync history stores information regarding the synchronization activities for users of the synchronization service.

In addition, in some implementations, the synchronization content storage 270 can communicate and/or share information with a diagnostic module 280 that can review synchronization data for the synced files. In cases where the synchronization data indicates that the client device 202 is associated with a likelihood of infection by malware, the diagnostic module 280 can further determine or confirm that the client device 202 has been infected by malware. In response, a remediation controller 250 can automatically invoke an antivirus service (see antivirus component 210) installed on, registered with, or otherwise associated with the now-infected client device 202 for remediation. In different implementations, this invocation can occur as a message or instruction transmitted from the remediation controller 250, and optionally via the synchronization content storage 270, to the synchronization client 220. The synchronization client 220 can then request that the antivirus component 210 initiate a remediation session for the client device 202 in order to remove the infection and repair the device.

Upon conclusion of the remediation session, in some implementations, the cloud service 204 can confirm or otherwise be configured to determine that the remediation of the first client device has successfully concluded. In response, a restoration controller 260 can initiate an automatic restoration of the corrupted file(s), with respect to (a) the copies of the file(s) stored on the client content storage 230 at the client device 202 as well or alternatively (b) as copies stored on the synchronization content storage 270 in the cloud service 204. In some implementations, the diagnostic module 280 can facilitate the restoration process by identifying the most recent version of a (now damaged) file that was the result of a sync session that occurred prior to the malware attack. In some implementations, this identification can follow a determination of an initial infection time, based on a review of a synchronization history of the first file, when an infected version of the first file was initially submitted for synchronization with the remote cloud service. Once the appropriate rollback point has been established, the infected version of the file can be replaced or updated with the undamaged version, as represented by a rollback version 232.

In different implementations, the cloud service 204 can also include or have access to a user account information module 212, which can enable or facilitate verification of any required user authorization 214 or consent to the automated remediation and/or automated restoration processes. In addition, a message generator 216 can work in conjunction with the user account information module 212 to identify various notification channels indicated by the user account, such as emails, direct messages via social media channels, instant messaging messages, and/or mobile device text messages. The message generator 216 can issue user notifications 476 and be configured to alert the user regarding a malware attack, obtain authorization when needed from a user, and/or provide updates regarding the automated processes.

Referring now to the sequence illustrated in FIGS. 3A-7, a further example of a scenario in which a malware remediation management system ("system") is implemented is presented. Beginning with FIG. 3A, a first sync session ("first session") 310 is initiated at a first time 312 ("3:00 PM") on a first day 314 ("Monday the $22^{nd}$") via a second device 320. During this first session 310, files 304 in a sync folder 324 are synchronized successfully, and at the conclusion of the first session 310 no indication of malware is detected by the system 300 (as represented by healthy device icon 322). Following a period of time 302, at a second time 332 ("9:00 AM") on a subsequent, second day 334 ("Wednesday the $24^{th}$"), a second sync session ("second session") 330 is initiated. It can be observed that at some point during period of time 302, the second device 320 and/or one or more files of the user account logged into the second device 320 have become infected with malware 326. In this scenario, for purposes of providing an example, the files are shown as being 'locked' following a ransomware attack 328. It should be understood that, in some implementations, additional or multiple synchronization sessions may have occurred during the period of time 302 that are not depicted here.

Figure 3A:
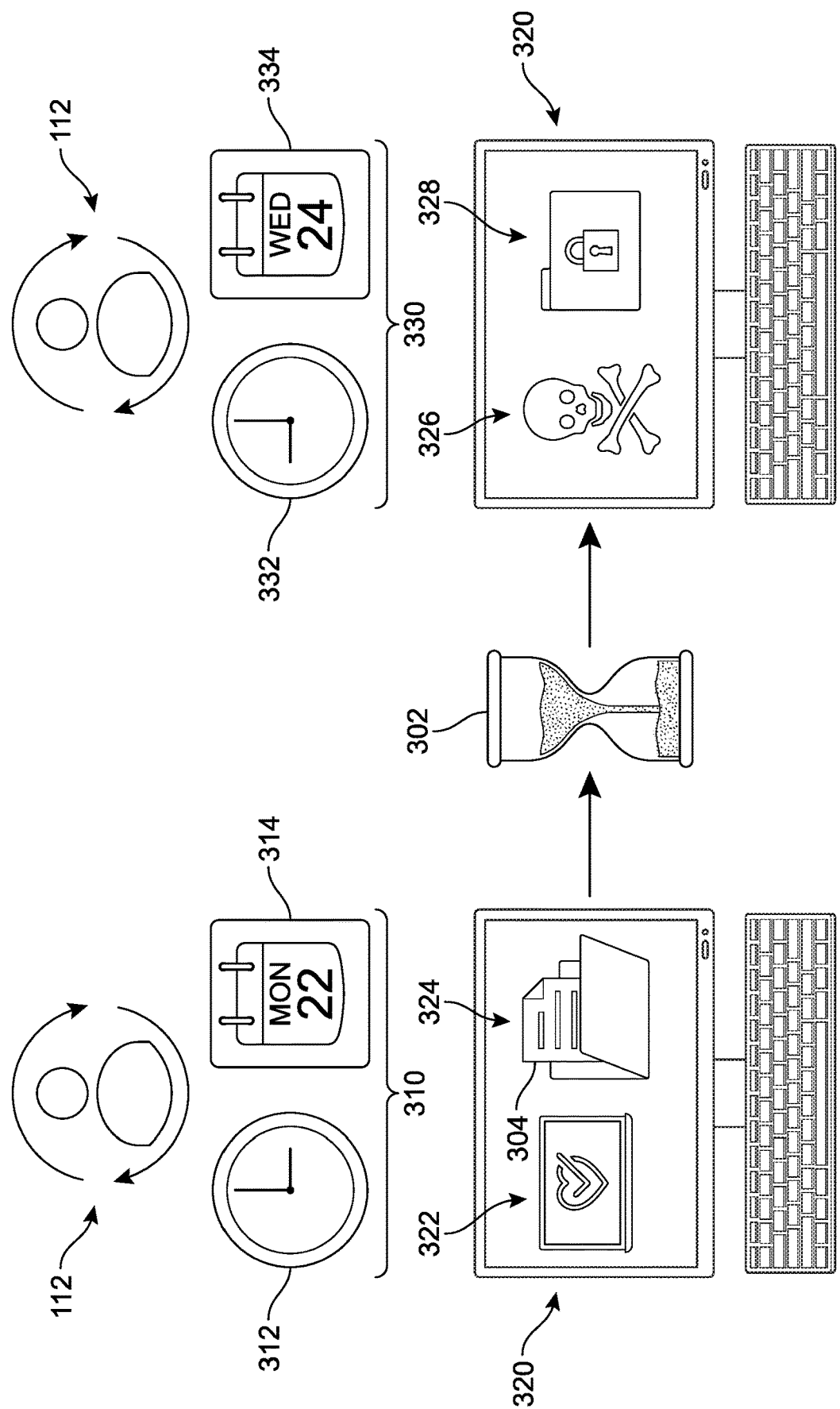
FIGS. 3A and 3B are conceptual illustrations of an implementation of a malware attack and a corresponding malware detection.
Figure 3B:
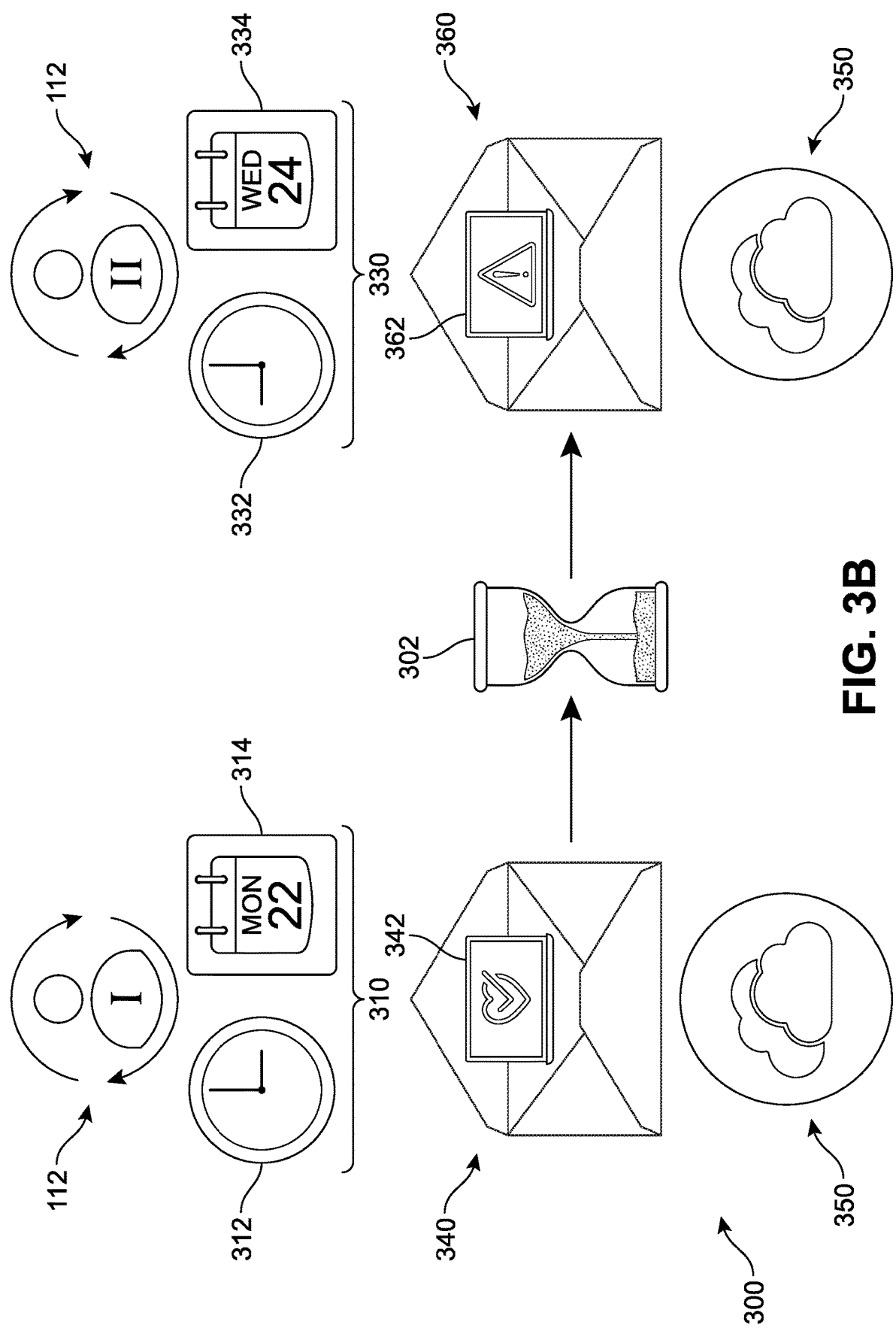

In different implementations, a malware remediation management system ("system") 300 can be configured to remain abreast of changes being made to files as they are synchronized with a cloud-based storage and computing service ("cloud storage service") 350, as represented in FIG. 3B. In some implementations, the system 300 can assess and/or review the synchronization progress and corresponding data during substantially parallel process with respect to the events shown in FIG. 3A. In FIG. 3B, during the first session 310, the system 300 can detect or otherwise obtain a first set of information 340 indicating that the files currently reflect a potentially normal or undamaged status 342. However, during or following the second session 330, the cloud storage service 350 may obtain a second set of information 360 and determine that a potential infection 362 of the client device has occurred. For example, the system 300 may detect that one or more of the files being synced are associated with indicators or potential malware symptoms.

Figure 4A:
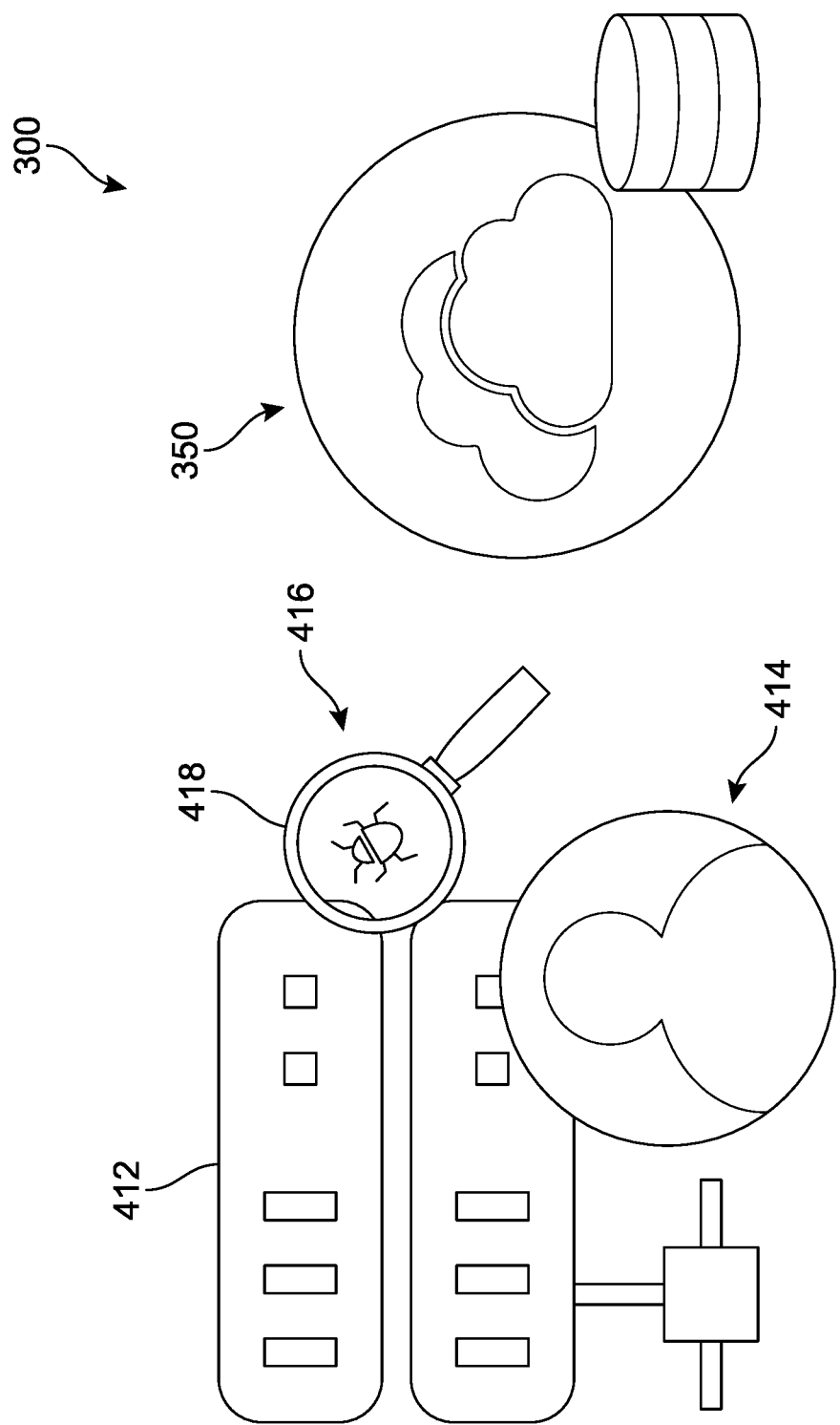
FIGS. 4A and 4B are conceptual diagrams illustrations of an implementation of a confirmation of a device infection and a determination of an infection time.

Referring next to FIG. 4A, in different implementations, at or around this time (during or soon after the second session 330), the system 300 can initiate an assessment, review, and/or evaluation 416 of the potentially damaged file as well as other files and data 412 associated with user's account 414 stored on the cloud storage service 350. If during this evaluation 416 the system 300 again detects anomalies or other discrepancies or information indicative of malware, the system 300 is configured to confirm the presence of an infection 418 on the client device.

Figure 4B:
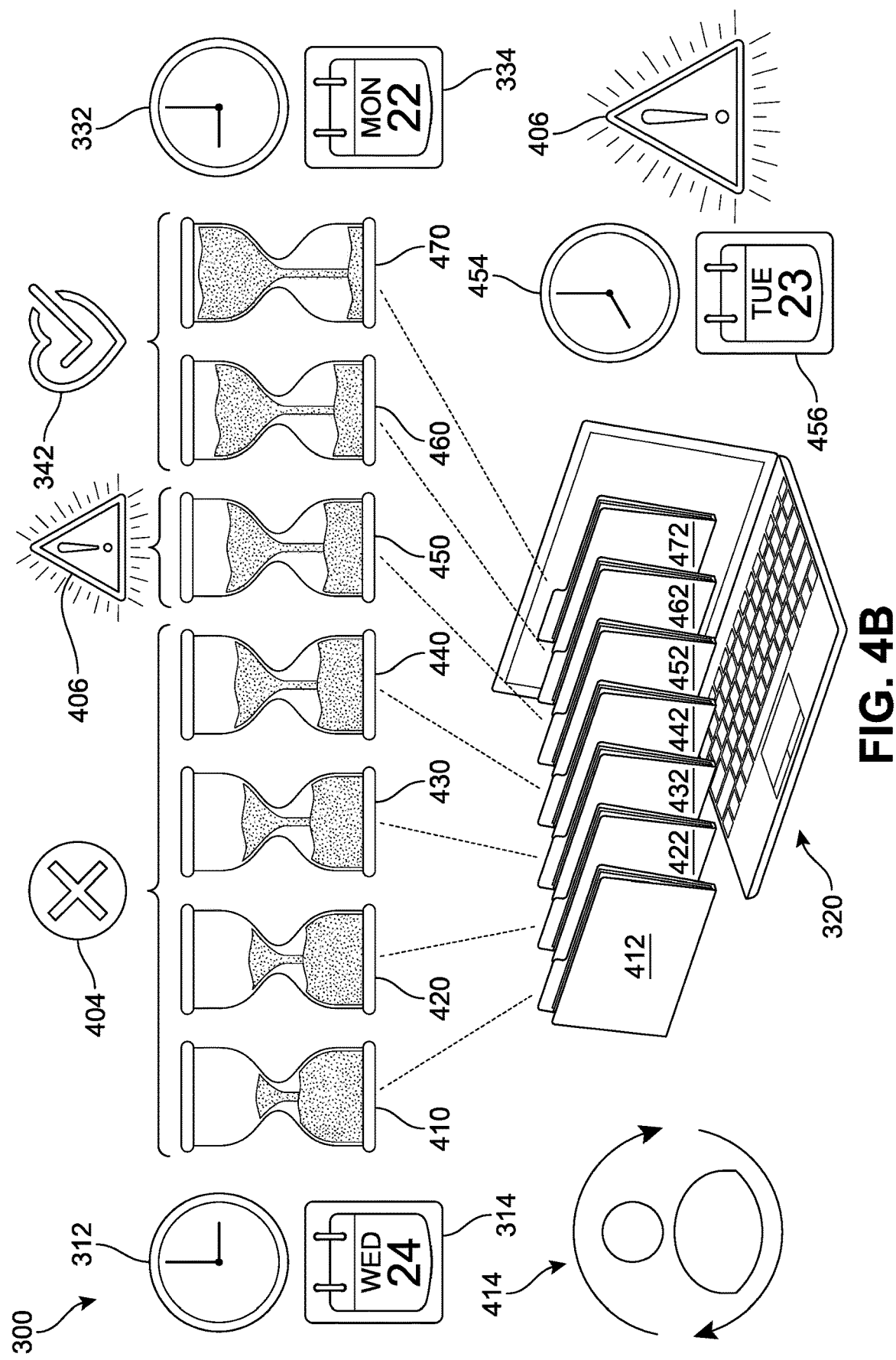

In some implementations, during this evaluation 416 and/or subsequent to the evaluation 416, the system 300 can optionally further proceed with a more in-depth or comprehensive analysis or diagnosis based on its own stored user synchronization history. For example, FIG. 4B depicts one possible approach that may be applied by the system 300 in determining when and at which file(s) the infection to the client device initially occurred. A plurality of previously synced versions of a single (impacted) file are displayed along the lower portion of FIG. 4B, for purposes of illustration for the reader. Each file version corresponds to a different sync session that occurred at a different time. In FIG. 4B, the system 300 initiates a review of files for the user's account 414 going 'backward' in time, from second time 332 on second day 334 (the known "post-infection" period) to first time 312 on first day 314 (the known "pre-infection" period).

During this process, the system 300 can evaluate, for example, a first file version 412 that synced during a first period 410, a second file version 422 that synced during a second period 420, a third file version 432 that synced during a third period 430, a fourth file version 442 that synced during a fourth period 440, a fifth file version 452 that synced during a fifth period 450, a sixth file version 462 that synced during a sixth period 460, and a seventh file version 472 that synced during a seventh period 470. As represented symbolically near the upper portion of FIG. 4B, in some implementations, the system 300 may determine that the files were corrupted 404 for several sync sessions going at least as far back as the fourth period 440. In some implementations, the system 300 may be able to approximately pinpoint the time of infection. In one implementation, the system 300 can establish an infection boundary 406 at the fifth period 450 (e.g., fifth file version 452) in order to ensure a clear delineation or quarantine of corrupted files. In some implementations, the system 300 may also approximately determine an infection day 456 and infection time 454 of the client device corresponding to this infection boundary 406. Before that time, for example at sixth time period 460 and earlier, the files (e.g., sixth file version 462) are deemed 'clean' or normal.

Figure 5:
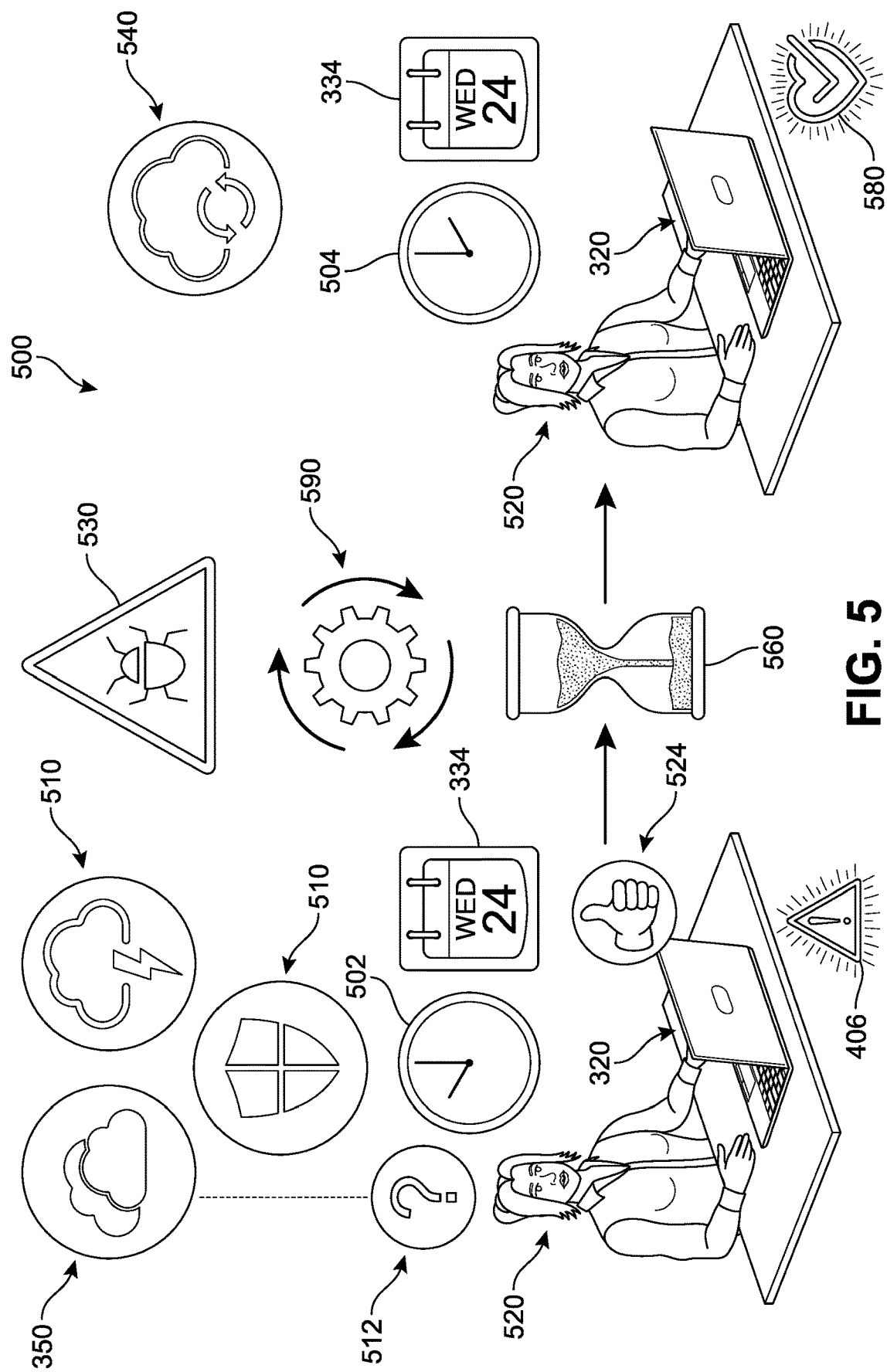
FIG. 5 is a representation of an automated remediation process.

In different implementations, in response to the determination that an infection has impacted file(s) associated with a user account and device, the system may automatically initiate an automated remediation process. In some implementations, the remediation may be directed primarily or entirely at the device from which the synchronized files were shared, while in other implementations, several or all devices associated with the user account may be subject to automated remediation. In FIG. 5, a depiction of a resultant automated remediation process 500 is illustrated. It can be seen that in some optional implementations, a user 520 may first receive an automated request 512 from the system that informs the user 520 of the infection and asks the user 520 to provide authorization, approval, or acknowledgement of the upcoming automated remediation process 500. In this example, the user 520, via the second device 320, provides the requested input 524. In response (in implementations where such input is required) the cloud storage service 500 automatically transmits a request or otherwise communicates instructions 510 to an antivirus provider 550 at an initial repair time 502 (10:00 AM). In cases where such input is not necessary, for example where authorization has been indicated or recorded at a time prior to this event, the automated remediation process 500 can move directly to remote execution of the antivirus provider 550.

For purposes of this example, the antivirus provider 550 is a locally installed or accessed application with which the user 520 has previously registered that is configured to repair second device 320 from damage resulting from malware attacks 530. Over a repair duration 560, the second device 320 can undergo a wide range of remediation processes 590, including but not limited to installation of any treatment software, running scripts, removing traces of malicious code (while leaving legitimate or uncorrupted files untouched), isolating the device, facilitating remote access, performing forensic analysis, and/or reimaging the device. Once the client-based malware repair service is triggered, the impacted device(s) can undergo a fully-automated point-in-time recovery without any further user input. While in this example the user 520 is shown adjacent to second device 320, in other examples, the user may be elsewhere (e.g., not present with the device) for the duration of the automated remediation process 500. In some other cases, the user 520 may even continue to work at second device 320 using resources of the second device that are unaffected, while the automated recovery of the device continues to occur, though there may be intervals where the process requests that the user 'step back' to allow the machine remediation work to occur without interruption, the overall process can be completed without any involvement of the user. The resulting repaired state is represented by a secured symbol 580. In this example, the automated remediation process 500 having occurred over repair duration 560, is complete at approximately a second time 504 (2:00 PM) on the same day. In other implementations, the process can occur over any timeframe, ranging from only a few seconds or minutes to several days. For example, if the infection was detected at an early stage, the process may be briefer, while if a user interrupts the process or the malware attack is more severe, it may require more time. Once the repairs are complete, the system may receive or otherwise obtain a signal 540 that the device is secure. In some implementations, an automated file restoration process may subsequently be initiated whereby corrupted file versions are replaced or restored by earlier, un-impacted file versions.

Figure 6A:
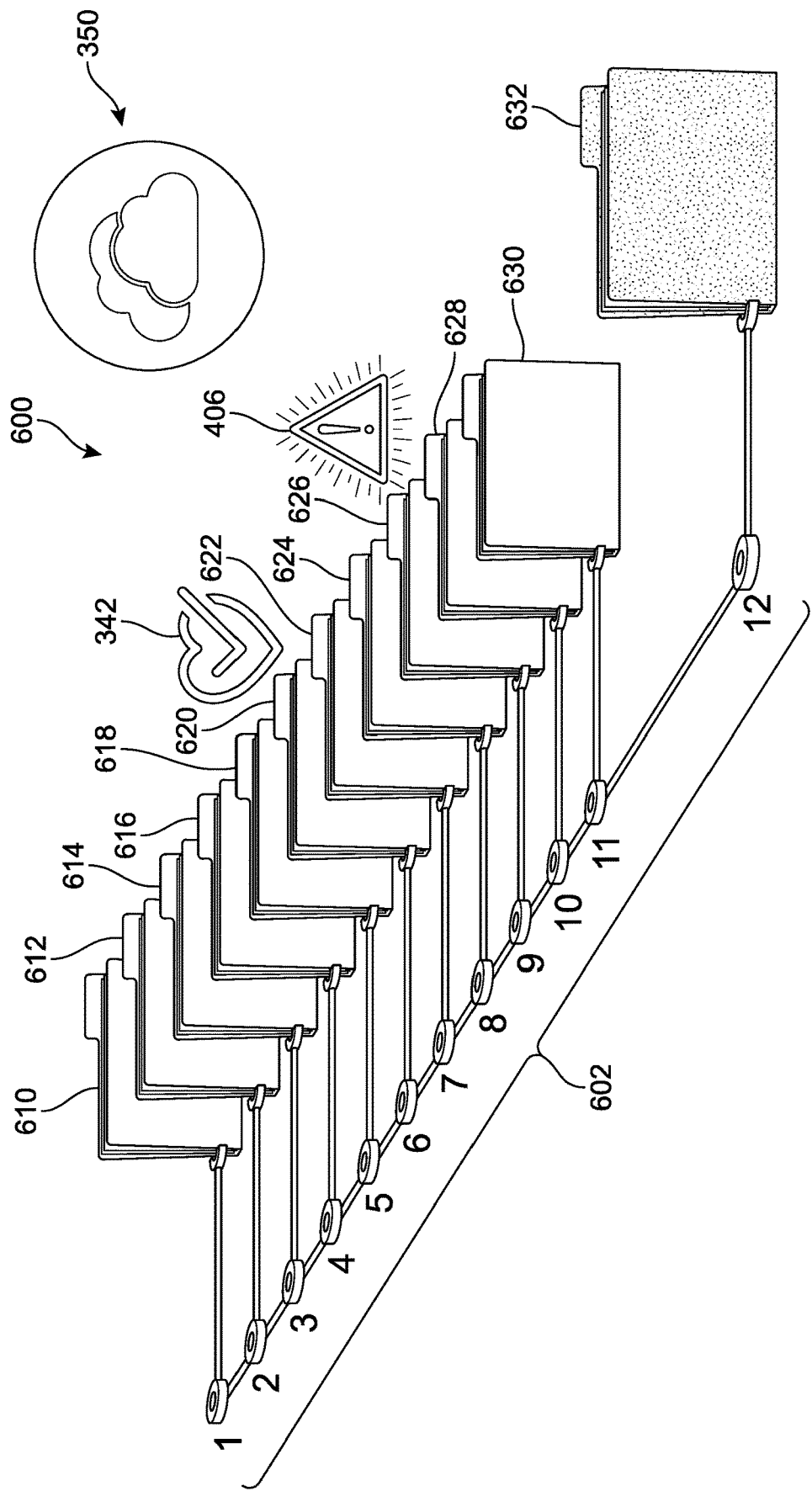
FIGS. 6A and 6B are a representation of an automated file restoration process.
Figure 6B:
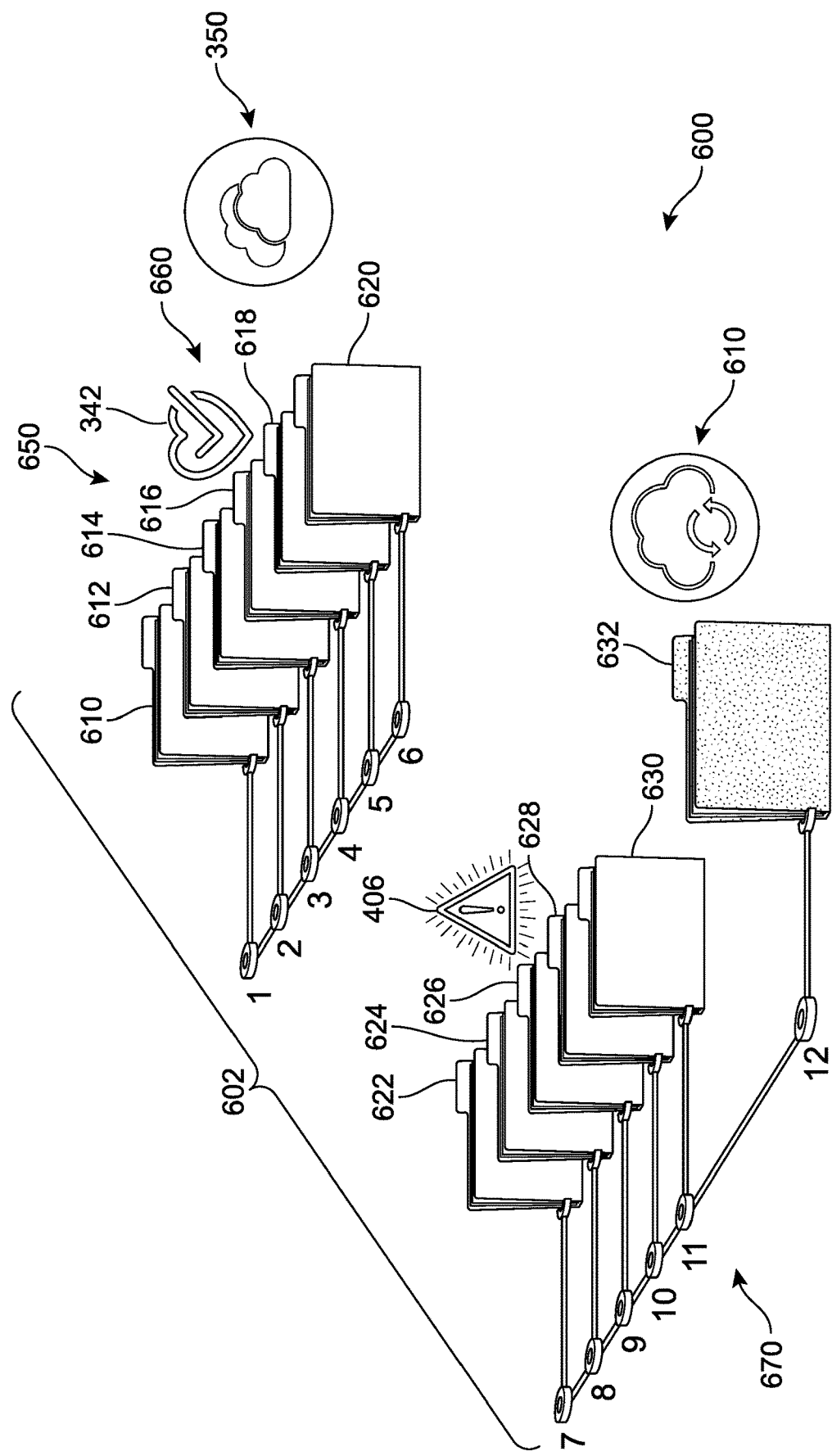

Referring next to FIGS. 6A and 6B, one implementation of an automated data restoration process 600 is illustrated. In different implementations, cloud storage service 350 includes or is able to access (if any) previous synced versions 650 of a file. For example, for substantially each data item or file that has been synchronized with a user's account, the cloud storage service 350 may include multiple versions corresponding to the file contents during past synchronization sessions in which this particular file was synced. In FIG. 6A, the cloud storage service 350 can make reference to a log or directory identifying the versions 650 available for or associated with a data item 602, here including a first (original) version 610, a second version 612, a third version 614, a fourth version 616, a fifth version 618, a sixth version 620, a seventh version 622, an eighth version 624, a ninth version 626, a tenth version 628, an eleventh version 630, and a twelfth (most recent or up-to-date) version 632. In this case, the system had determined that file corruption (see infection boundary 406) was present beginning at eighth version 624 and onward to twelfth version 632, and file versions prior to the eighth version 624 (i.e., first through seventh versions) are uninfected (see undamaged status 342). Restoration of a file—for example, a reversion of a file to a previous version of the same file—can involve identification of the previous or most recent 'secured' or uncorrupted version of the file that is available for reversion. In one implementation, the system can also bolster or provide an additional safeguard by initiating a rollback of the account state to a time prior to the date of the first file affected by ransomware. In other words, while in some implementations the system can be configured to revert to a file version that existed directly prior to the infection to maximize the data recovery, in some other implementations, the system can instigate a rollback process that includes a 'buffer' period. This buffer period can extend earlier backwards from the time of infection and encompass synchronization sessions that synced one or more safe versions of the file, in order to fully ensure all traces of damage to the file are rolled back.

One possible result of this type of automated data restoration process 600 is illustrated in FIG. 6B. Having determined that the corruption had occurred following a synchronization session in which the eighth version 624 was synced, a rollback 610 can in some implementations retrieve or revert to the seventh version 622 for restoration. In other implementations, as shown in FIG. 6B, a more 'conservative' application of the restoration process 600 is shown, where the seventh version 622 is seen to have occurred during the buffer period between the infection state and the pre-infection state. The selection of a reversion boundary (e.g., how wide or large the buffer period should extend) can also be adjusted or selected by the end-user in some implementations. In this case, the rollback 610 entails instead bringing the sixth version 620 to the 'front' of the version queue to serve as the most-recent version of the file that will be deemed secure and made accessible to the user. The sixth version 620 heads or is the most current version of a restored versions set 660. A set of damaged (or potentially damaged) versions 670 of files can be removed, quarantined, isolated, destroyed, or otherwise distinguished from the restored version set 660, for example, per user preferences. In some implementations, these damaged versions 670 may be maintained indefinitely in the event that a user wishes to later attempt further recovery of data only available in one of the corrupt versions of the file(s).

Figure 7A:
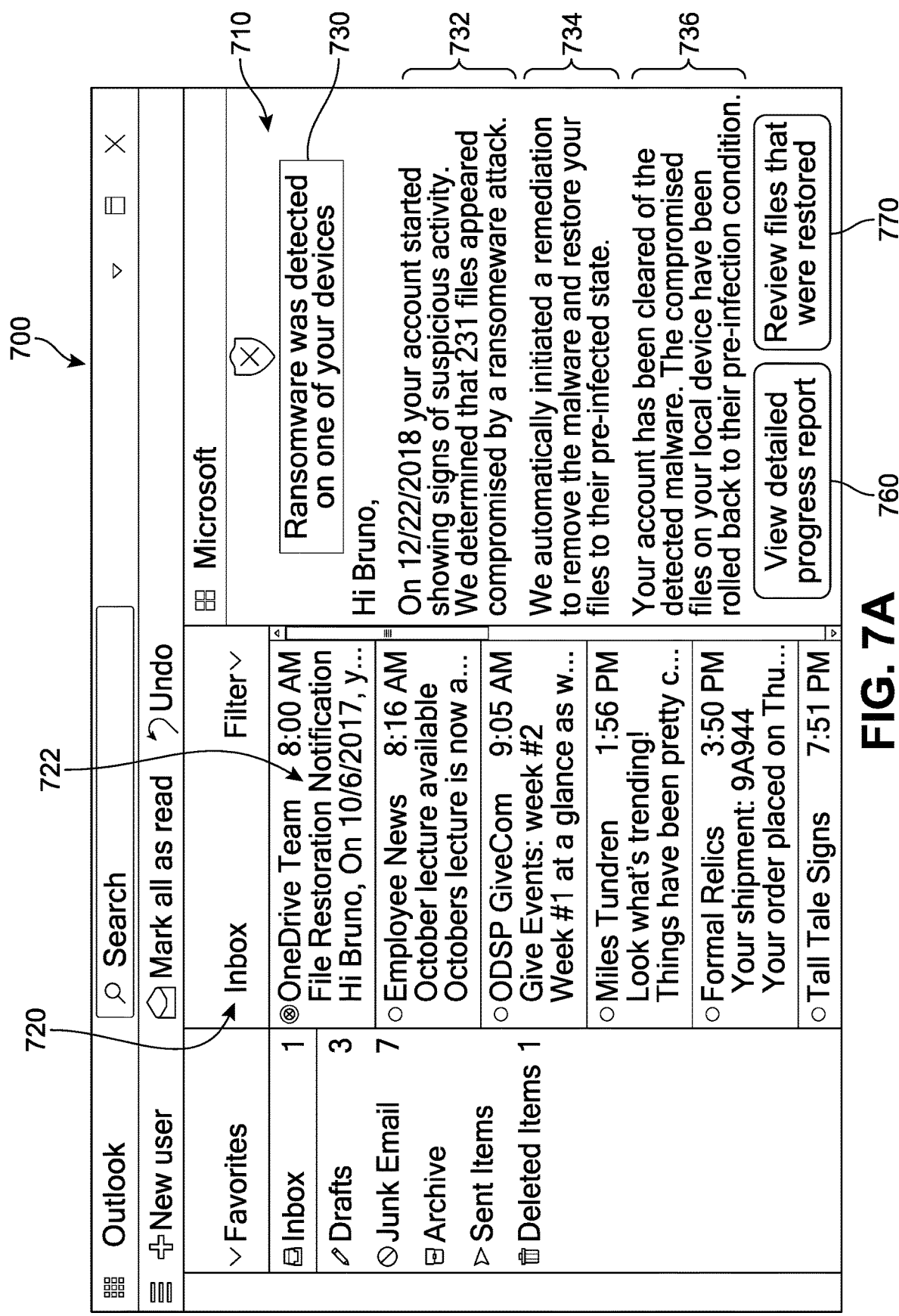
FIG. 7A is a representation of a device display with an implementation of a notification of the occurrence of remediation and restoration of a user device.

During or following the automated remediation and/or automated data recovery processes, in different implementations, a user may be notified of one or more stages in the process. These notifications can be automated, and may be transmitted per system settings and/or user preferences. One example is shown in FIG. 7A, where a user interface 700 displaying e-mail messages for a user account is depicted. While an e-mail message is presented for purposes of this example, it should be understood that in other implementations, any other form of communication associated with the user's account may be used to provide such information, including but not limited to text messages, chat messages, pop-up windows, automated phone calls, symbolic indicators (shown briefly or multiple occasions on the display while the processes occur), or other native controls can be used. In this case, an e-mail message ("message") 710 from the system is delivered to the e-mail account linked to the user account associated with the infected client device. A subject line 722 alerts the user that this is a "File Restoration Notification". The message 710 includes a subject summary 730 "Ransomware was detected on one of your devices". In some implementations, the message 710 can further include a section comprising (for example) a diagnosis summary 732 that can inform the user of the issue(s) that were detected ("Hi Bruno, On Dec. 22, 2018 your account started showing signs of suspicious activity. We determined that 231 files appeared compromised by a ransomware attack"). In one implementation, this can be followed by an action summary 734 that can describe the steps that were deemed necessary to address the issue(s) ("We automatically initiated a remediation to remove the malware and restore your files to their pre-infected state"). Furthermore, the message 710 can include a status summary 736 whereby the user is informed of the current state of his or her device(s) and data ("Your account has been cleared of the detected malware. The compromised files on your local device have been rolled back to their pre-infection condition"). In some implementations, the message 710 can also offer the user one or more selectable options or links, or otherwise provide guidance or suggestions as to how the user may obtain additional or more detailed information. For example, the message 710 includes a first selectable option 760 for viewing further details ("View detailed progress report") and a second selectable option 770 for accessing or viewing the changed files ("Review files that were restored"). Such options can also offer or allow the user to navigate to other menu interface from which the user can make modifications to their automated remediation and restoration settings, as well as undo a file rollback if so desired. For example, the user may wish to opt-out of one or more steps of the automated processes, opt-in to other services to increase automation, and/or request that notifications be provided via a different mechanism.

Figure 7B:
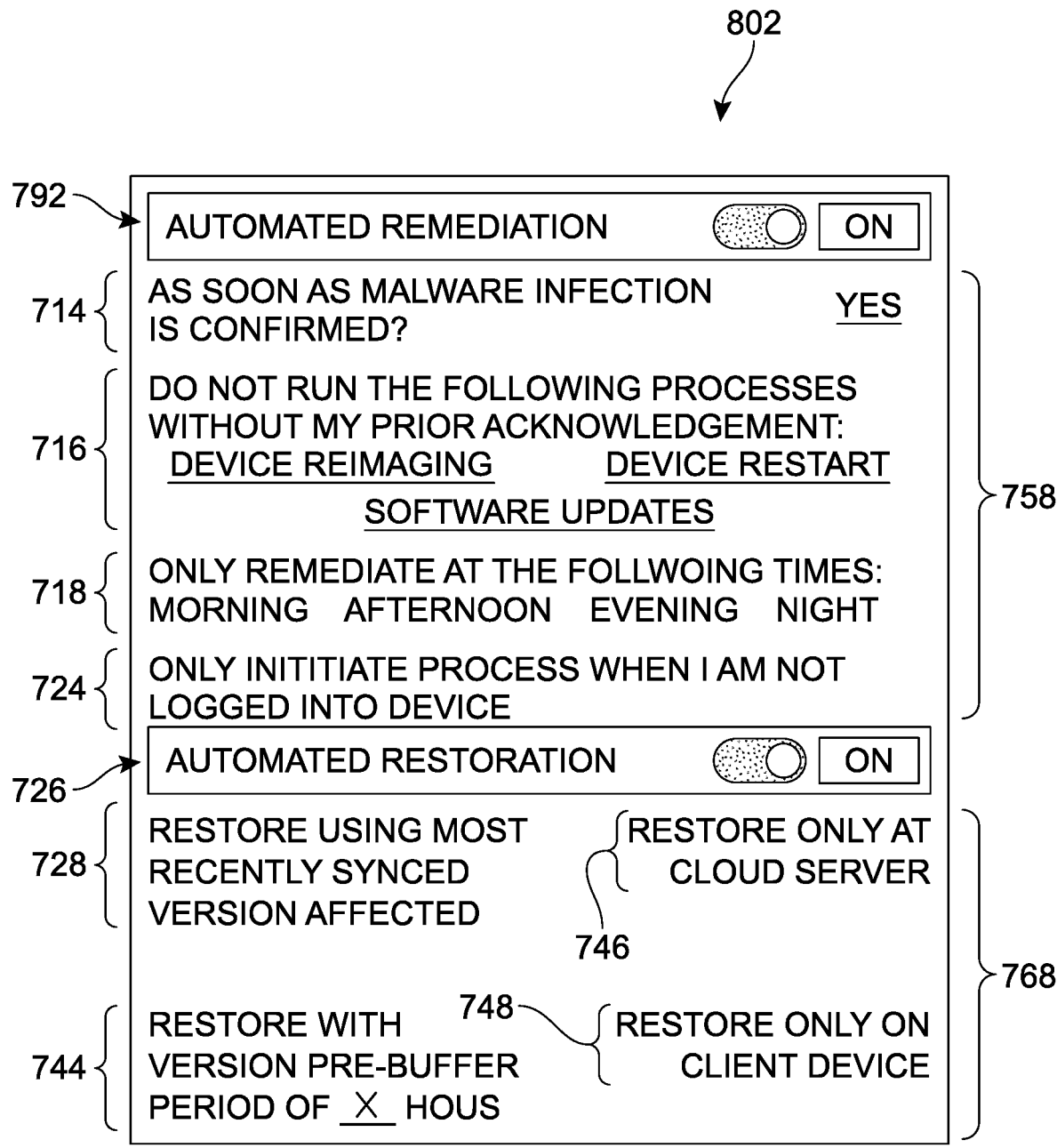
FIG. 7B is a example of a user interface for adjusting user preferences for automated remediation and restoration of a user device.

One example of a user interface 708 for adjusting user preferences and providing authorization to the automated remediation and restoration process is shown with reference to FIG. 7B. In this case, the user interface 708 presents options for both the remediation in an upper section 758 and restoration in a lower portion 768. In the upper section a user is offered a first selectable option 792 to authorize or enable automated remediation. Additional settings include first selectable sub-option 714 ("As soon as malware infection is confirmed?"), a second selectable sub-option 716 ("Do not run the following processes without my prior acknowledgement: Device reimaging, Device restart, Software updates"), a third selectable sub-option 718 ("Only remediate at the following times: Morning/Afternoon/Evening/Night"), and a fourth selectable sub-option 724 ("Only initiate process when I am not logged into device"). In the lower section a user is offered a second selectable option 726 to authorize or enable automated restoration. Additional settings include fifth selectable sub-option 728 ("Restore using most recently synced version unaffected [by malware]?"), a sixth selectable sub-option 744 ("Restore with version pre-buffer period of X hours?"), a seventh selectable sub-option 746 ("Restore only at cloud server?"), and an eighth selectable sub-option 748 ("Restore only on client device?"). It should be understood that the options and their arrangement shown herewith are presented simply for purposes of illustration, and many other possible user preference settings or tasks are possible, including but not limited to those providing or adjusting the implementation features described earlier with respect to FIGS. 1-7A.

It should be understood that the disclosed process and system can be applicable to both enterprise environments, which typically include network administrators and other information technology workers, as well as consumer-level entities that are frequently the targets of malware attacks on their personal computing devices. These automated processes allow individuals to feel confident that malware attacks are being dealt with appropriately, even in the absence of network supervisors.

Figure 8A:
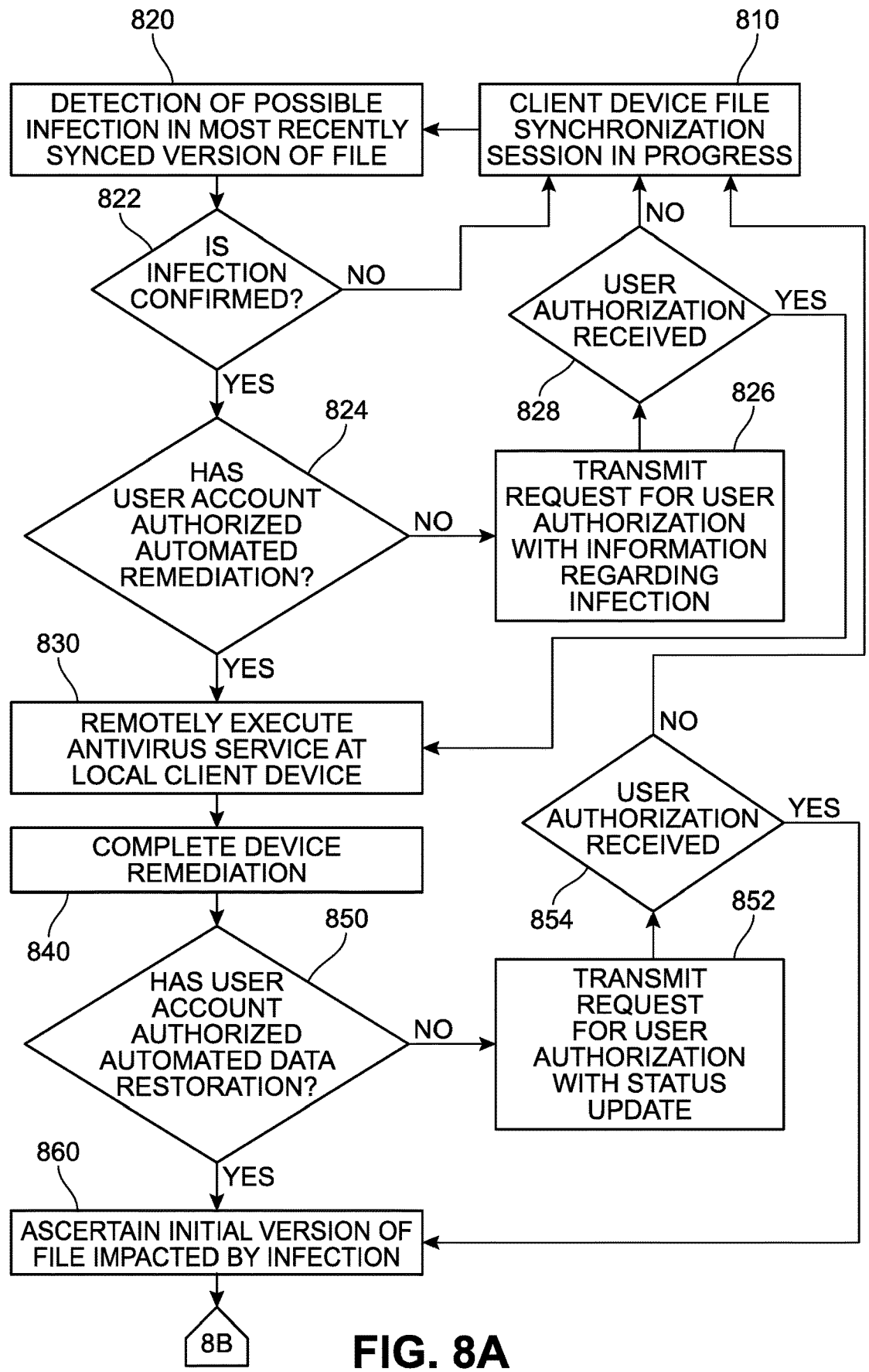
FIGS. 8A and 8B are a flow diagram illustrating an implementation of a process for automatic remediation and restoration.
Figure 8B:
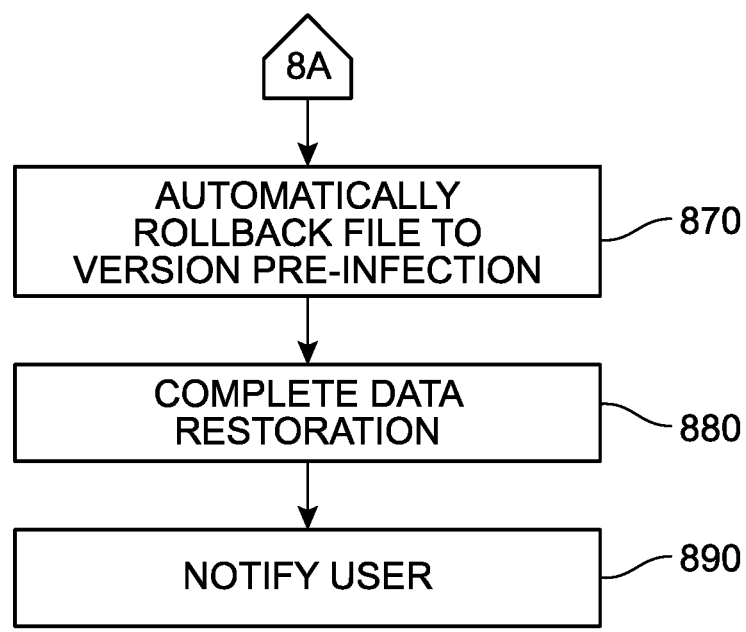

For purposes of clarity, FIG. 8 illustrates one implementation of a process 800 for providing automated remediation and restoration services to a local client device (e.g., via a remote cloud service). In this example, a first stage 810 includes establishing a synchronization session with a client device for one or more files. In a second stage 820, the system associated with the remote cloud service may detect a possible infection based on the most recently or somewhat recently synced version of a file. If the system in a third stage 822 is able to confirm the client device has been infected by malware ("Yes"), the process 800 may continue. If there is no infection, the process may end or return to initiate at the start of another synchronization session or file sync.

In a fourth stage 824, the system can ascertain whether the user account associated with this sync session has authorized an automated remediation process. If authorization is not available ("No"), a request may be transmitted to obtain user authorization in a fifth stage 826. In some implementations, the request may also include information regarding the infection for the user's review. If no authorization is received at a sixth stage 828 ("No") the process may end or return to initiate at the start of another synchronization session or file sync. However, if the user provides his or her authorization at the sixth stage 828 ("Yes"), or if the authorization was already available following the fourth stage 824, the process 800 can continue in a seventh stage 830, where the cloud service remotely executes an antivirus service at the local client device. In some implementations, for example if the antivirus service is unable to complete remediation for some reason, the user may follow up by completing a manual repair.

Once the device remediation is complete (eighth stage 840), the system can ascertain whether the user account associated with this sync session has authorized an automated data restoration process in a ninth stage 850. If authorization is not available ("No"), a request may be transmitted to obtain user authorization in a tenth stage 852. In some implementations, the request may also include information regarding the remediation and upcoming planned restoration for the user's review. If no authorization is received at an eleventh stage 854 ("No") the process may end or return to initiate at the start of another synchronization session or file sync. However, if the user provides his or her authorization at the eleventh stage 854 ("Yes"), or if the authorization was already available following the ninth stage 850, the process 800 can continue in a twelfth stage 860, where the cloud service can assess and/or ascertain when the infection occurred and/or which version of the impacted file(s) was first corrupted. Based on this determination, the system can automatically roll-back the damaged file version(s) to earlier versions in which no infection had yet occurred or caused damage in a thirteenth stage 870. The data restoration can be directed to either or both of the cloud storage files and the client device files. Once completed in a fourteenth stage 880, the service may generate and convey a notification to the user account in a fifteenth stage 890.

Figure 9:
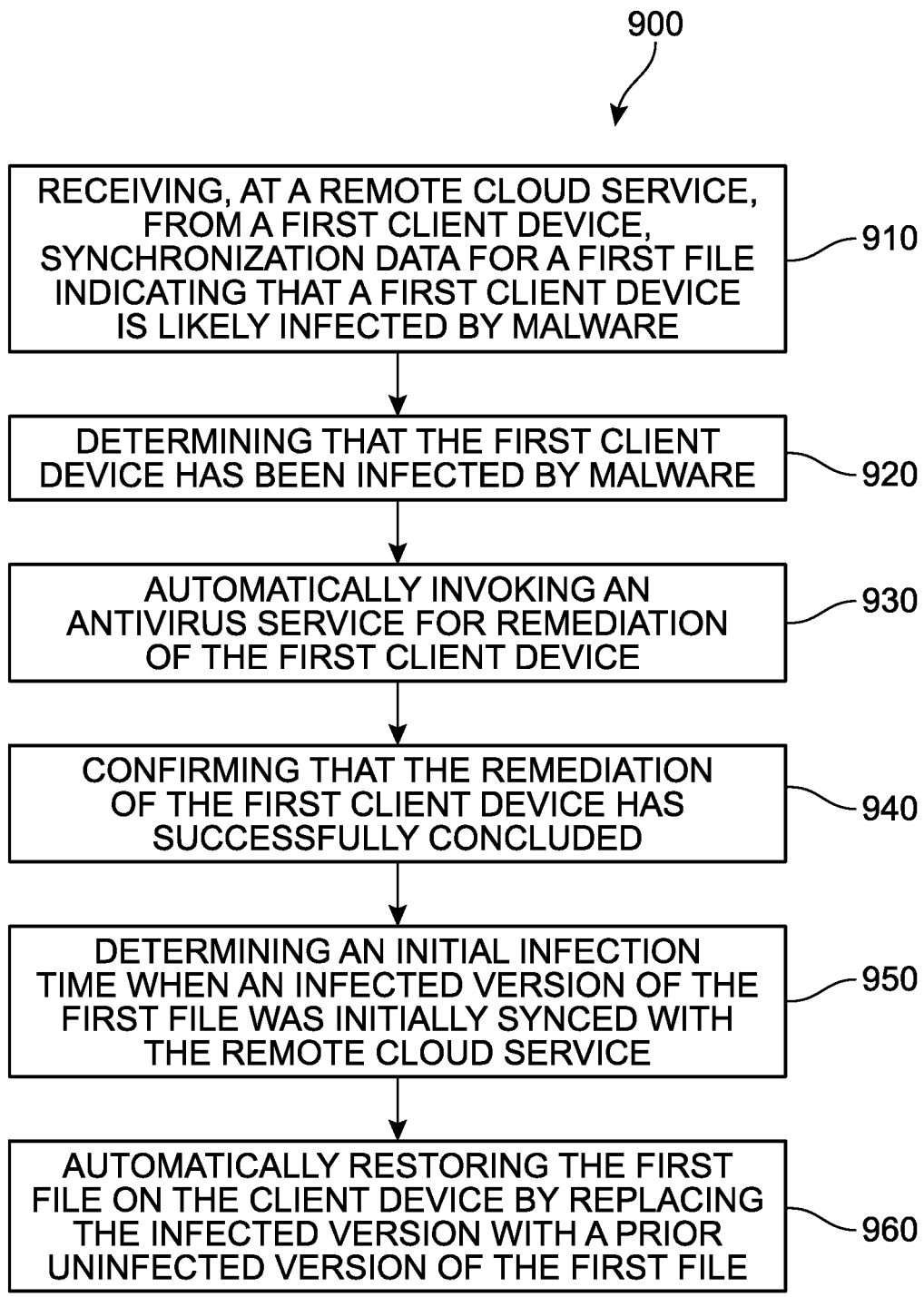
FIG. 9 is a flow chart presenting an implementation of an automatic remediation and restoration process.

FIG. 9 is a flow chart illustrating an implementation of a method 900 of automatically remediating a user device and recovering data for the user device. In the example of FIG. 9, a first step 910 includes receiving, at a remote cloud service, from a first client device over a communication network during a synchronization session, synchronization data for a first file indicating that a first client device is associated with a likelihood of infection by malware. In a second step 920, the method 900 includes determining, at the remote cloud service, in response to receiving the synchronization data, that the first client device has been infected by malware. A third step 930 includes automatically invoking an antivirus service for remediation of the first client device in response to the determination that the first device has been infected, the first device being registered with the antivirus service. A fourth step 940 involves confirming, at the remote cloud service, that the remediation of the first client device has successfully concluded, and a fifth step 950 includes determining an initial infection time, based on a review of a synchronization history of the first file, when an infected version of the first file was initially submitted for synchronization with the remote cloud service. A sixth step 960 includes automatically restoring the first file on the client device by identifying a first version of the first file synced prior to the initial infection time and replacing the infected version with the first version. The identification can occur at the remote cloud service by reference to the history for that particular file as stored in a cloud storage.

In other implementations, additional steps may be included. For example, in some implementations, the malware can be one of a ransomware, spyware, adware, virus, or worm. In another example, the antivirus service may be locally installed on the first client device. In some implementations, the first version corresponds to the most recent version of the first file that was synced prior to the initial infection time, while in other implementations the first version corresponds to a version of the first file that was synced during a synchronization session that occurred earlier than the initial infection time by at least a predetermined buffer period.

In other examples, the method further includes automatically restoring a copy of the first file within a remote cloud storage by reverting the infected version stored in the remote cloud storage to the first version. In addition, the method can include receiving, at the remote cloud service, from a user account associated with the first client device, authorization to enable automated remediation, and/or receiving, at the remote cloud service, from a user account associated with the first client device, authorization to enable automated restoration of files on the client device. In some cases, the authorization is obtained prior to receiving the synchronization data for the first file, while in other cases the authorization is obtained after determining that the first client device has been infected by malware in response to a request from the remote cloud service. In one implementation, the method further includes receiving synchronization data for a plurality of files from the first client device during the synchronization session, characterizing a subset of the plurality of files as having been damaged by the malware, and automatically restoring only the subset of the plurality of files.

As noted previously, the ability to provide users a mechanism by which to better manage device remediation and restoration of electronic content can significantly improve workflow efficiency and protect user data. By detecting situations that can lead to potential data damage, the automated system can allow users a peace of mind in their everyday computing use. Through the use of this system, users can continue to reliably access and maintain the most recent secured versions of their electronic content from different devices, despite malware attacks on their own devices. In addition, by providing users with notifications following these automated processes, users are given an opportunity to remain abreast of the status of their electronic content, particularly in situations where the user might otherwise have remained unaware of the attack and/or reversion of files. This type of approach can help a user feel more confident in the security and access of their electronic content, and/or reduce the possibility of their experiencing loss of data. Because restoration is limited to only those files that have been impacted by the malware, the overall process is significantly less intrusive than standard remediation processes, and the likelihood of rolling back an intentional user change is much lower. These processes can also be configured to occur asynchronously, at times and occasions that would be least disruptive to the user per the user's own preferences.

The detailed examples of systems, devices, and techniques described in connection with FIGS. 1-9 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-9 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 10:
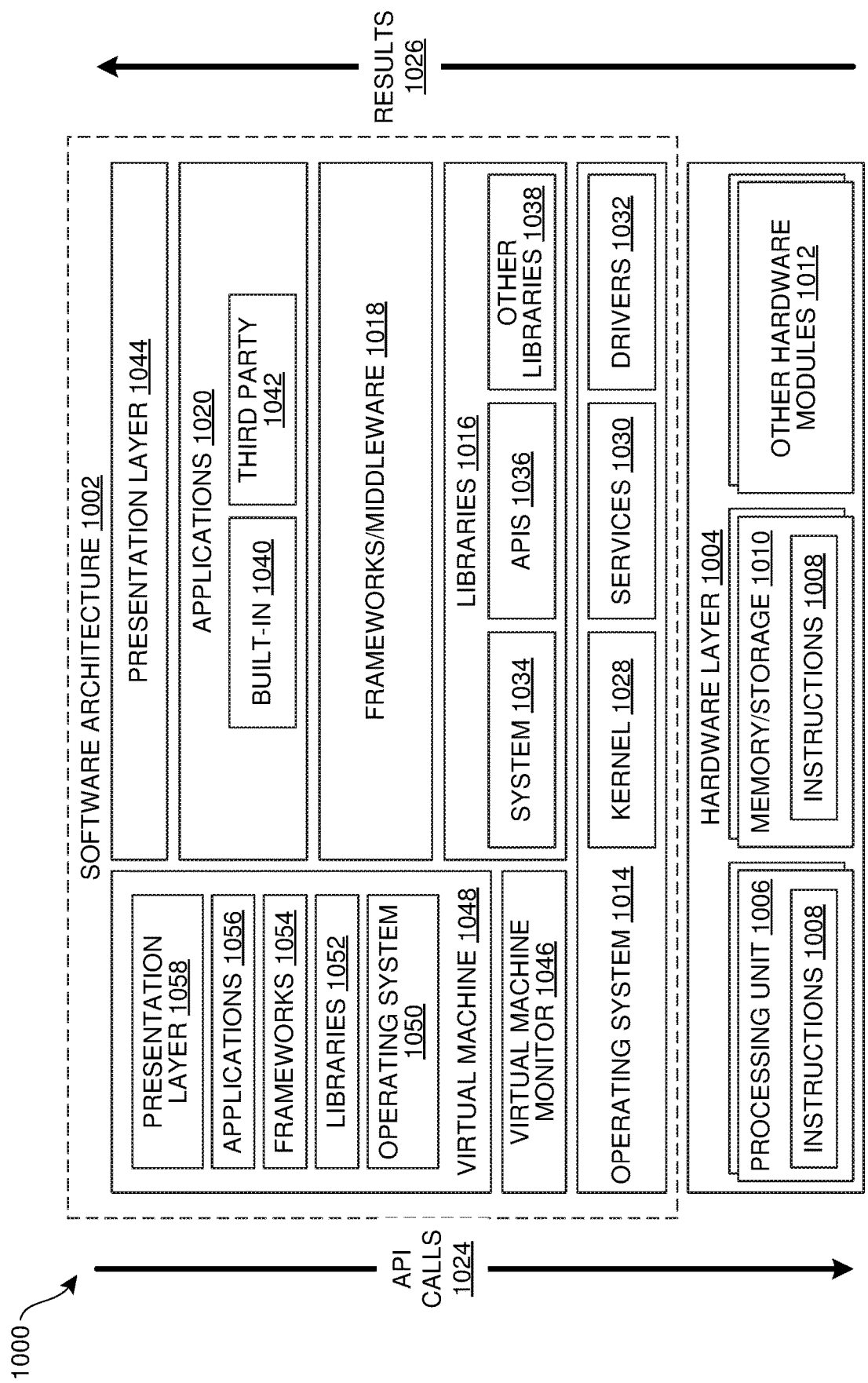
FIG. 10 is a block diagram of an example computing device, which may be used to provide implementations of the mechanisms described herein.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a device 120 of FIG. 1A that includes, among other things, document storage 1070, processors, memory, and input/output (I/O) components. A representative hardware layer 1004 is illustrated and can represent, for example, the device 120 of FIG. 1. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1008 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1000 of FIG. 10, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
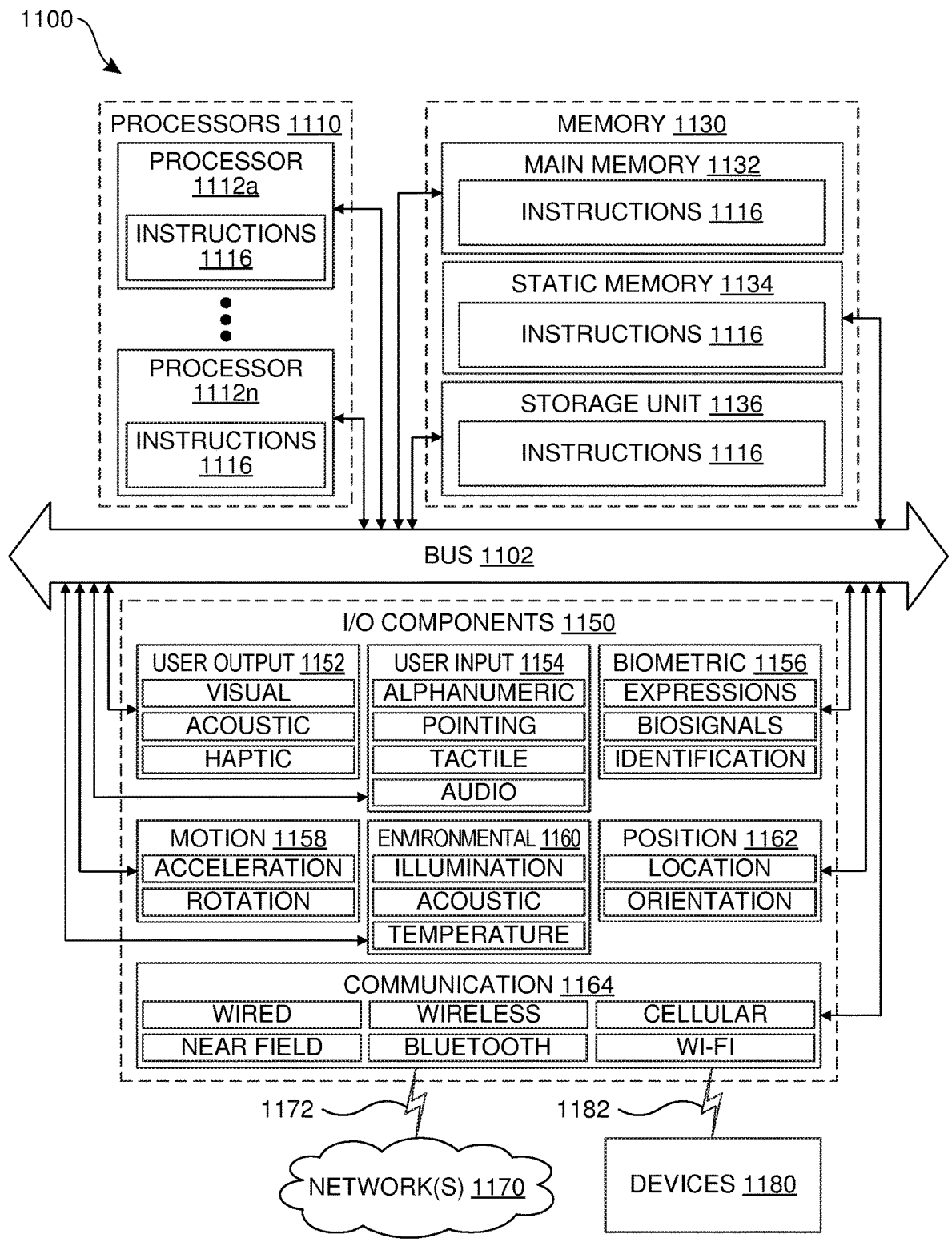
FIG. 11 is a block diagram illustrating components of an example machine configured to read instructions from a machine-readable medium.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" include a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156 and/or position components 1162, among a wide array of other environmental sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 7,181,531 to Pinkerton et al., issued Feb. 20, 2017 and titled "Method to synchronize and upload an offloaded network stack connection with a network stack,"; U.S. Patent Publication Number 2008/0005188 to Teodosiu et al., published Jan. 3, 2008 and titled "Content Synchronization in a File Sharing Environment,"; U.S. Patent Publication Number 20090300169 to Sagar et al., published Jan. 3, 2008 and titled "Synchronization throttling based on user activity,"; U.S. Patent Publication Number 20060080363 to Vadlamani et al., published Apr. 13, 2006 and titled "Synchronization for smart clients,"; U.S. Pat. No. 9,110,892 to Didcock et al., issued Aug. 18, 2015 Feb. 20, 2017 and titled "Synchronizing local and remote data,"; U.S. Patent Publication Number 20150112924 to Vanturennout et al., published Apr. 23, 2015 and titled "Data classification for adaptive synchronization,"; and U.S. Patent Publication Number 20140258703 to Vanturennout et al., published Sep. 11, 2014 and titled "Adaptive data synchronization,"; U.S. Pat. No. 8,230,511 to Khilnani et al., issued Jul. 24, 2012 and titled "Trusted operating environment for malware detection,"; U.S. Pat. No. 8,850,581 to Wang et al., issued Sep. 30, 2014 and titled "Identification of malware detection signature candidate code,"; U.S. Pat. No. 9,819,689 to Chandola et al., issued Nov. 14, 2017 and titled "Large scale malicious process detection,"; U.S. Pat. No. 7,181,531 to Pinkerton et al., issued Feb. 20, 2017 and titled "Method to synchronize and upload an offloaded network stack connection with a network stack,"; U.S. Pat. No. 9,015,843 to Griffin et al., issued Apr. 21, 2015 and titled "Predictive malware threat mitigation,"; U.S. Pat. No. 8,719,935 to Polyakov et al., issued May 6, 2014 and titled "Mitigating false positives in malware detection,"; U.S. Pat. No. 8,713,679 to Zorn et al., issued Apr. 29, 2014 and titled "Detection of code-based malware,"; U.S. Pat. No. 8,627,475 to Loveland et al., issued Jan. 7, 2014 and titled "Early detection of potential malware,"; U.S. Patent Publication Number 2013/0160126 to Kapoor et al., published Jun. 20, 2013 and titled "Malware remediation system and method for modern applications," the disclosures of which are each herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An automated remediation and restoration system comprising:
   a processor; and
   computer readable media including instructions which, when executed by the processor, cause the processor to:
      receive, at a remote cloud service, from a first client device over a communication network during a synchronization session, synchronization data for a first file indicating that a first client device is associated with a likelihood of infection by malware;
      determine, at the remote cloud service, in response to receiving the synchronization data, that the first client device has been infected by malware;
      access first user account information associated with the first client device to identify remediation actions approved to be automatically invoked on the first client device responsive to determining that the first client device has been infected by malware;
      automatically invoke, on the first client device, the remediation actions that have been approved to be invoked automatically for remediation of the first client device;
      confirm, at the remote cloud service, that the remediation of the first client device has successfully concluded;
      determine an initial infection time, based on a review of a synchronization history of the first file, when an infected version of the first file was initially submitted for synchronization with the remote cloud service;
      automatically restore the first file on the first client device by identifying, at the remote cloud service, a first version of the first file synced prior to the initial infection time and replacing the infected version with the first version;
      automatically identify a second client device associated with the first user account information that did not access the first file;
      determine that the second client device has been infected by the malware; and
      automatically invoke the remediation actions approved to be invoked automatically for remediation of the second client device responsive to determining that the second client device has been infected by the malware.

2. The system of claim 1, wherein the malware is one of a ransomware, spyware, adware, virus, or worm.

3. The system of claim 1, wherein an antivirus service is locally installed on the first client device.

4. The system of claim 1, wherein the instructions further cause the processor to automatically restore a copy of the first file within a remote cloud storage by reverting the infected version stored in the remote cloud storage to the first version.

5. The system of claim 1, wherein a plurality of files on the first client device are damaged by malware, and wherein the instructions further cause the processor to automatically restore a copy of each of the plurality of files within a remote cloud storage by reverting an infected version of each damaged file to a version of the file synced prior to the initial infection time.

6. The system of claim 1, wherein the first version corresponds to a version of the first file synced during a synchronization session that occurred earlier than the initial infection time by at least a predetermined buffer period.

7. The system of claim 1, wherein the instructions further cause the processor to receive, at the remote cloud service, from a first user account associated with the first client device, authorization to enable automated restoration of files on the first client device.

8. The system of claim 7, wherein the authorization is obtained prior to receiving the synchronization data for the first file.

9. The system of claim 7, wherein the authorization is obtained after determining that the first client device has been infected by malware in response to a request from the remote cloud service.

10. The system of claim 1, wherein the instructions further cause the processor to: determine that a second file associated with the second client device was infected with the malware; automatically restore the second file on the second client device by identifying, at the remote cloud service, a first version of the second file synced prior to an initial infection time of the second file; and replace an infected version of the second file with the first version of the second file.

11. The system of claim 1, wherein the instructions further cause the processor to:
receive an indication of acceptable times at which automatic restoration of the files may be performed on the second client device; and
automatically invoke the remediation actions on the second client device at a time of the acceptable times.

12. A method comprising:
receiving, at a remote cloud service, from a first client device over a communication network during a synchronization session, synchronization data for a first file indicating that a first client device is associated with a likelihood of infection by malware;
determining, at the remote cloud service, in response to receiving the synchronization data, that the first client device has been infected by malware;
accessing first user account information maintained by the remote cloud service and associated with the first client device to identify remediation actions approved to be automatically invoked on the first client device responsive to determining that the first client device has been infected by malware;
automatically invoking, on the first client device, the remediation actions that have been approved to be invoked automatically for remediation of the first client device in response to the determination that the first client device has been infected, the first client device being registered with an antivirus service;
confirming, at the remote cloud service, that the remediation of the first client device has successfully concluded;
determining an initial infection time, based on a review of a synchronization history of the first file, when an infected version of the first file was initially submitted for synchronization with the remote cloud service;
automatically restoring the first file on the first client device by identifying, at the remote cloud service, a first version of the first file synced prior to the initial infection time and replacing the infected version with the first version;
automatically identifying a second client device associated with the first user account information that did not access the first file;
determining that the second client device has been infected by the malware; and
automatically invoking the remediation actions approved to be invoked automatically for remediation of the second client device responsive to determining that the second client device has been infected by the malware.

13. The method of claim 12, wherein a plurality of files on the first client device are damaged by malware, and wherein the first version corresponds to a version of the first file synced during a synchronization session that occurred prior to an earliest initial infection time among the plurality of files.

14. The method of claim 12, further comprising automatically restoring a copy of the first file within a remote cloud storage by reverting the infected version stored in the remote cloud storage to the first version.

15. The method of claim 12, wherein the first version corresponds to a most recent version of the first file synced prior to the initial infection time.

16. The method of claim 12, wherein the first version corresponds to a version of the first file synced during a synchronization session that occurred earlier than the initial infection time by at least a predetermined buffer period.

17. The method of claim 12, further comprising receiving, at the remote cloud service, from a first user account associated with the first client device, authorization to enable automated restoration of files on the client device.

18. The method of claim 12, wherein authorization is obtained prior to receiving the synchronization data for the first file.

19. The method of claim 12, further comprising:
receiving synchronization data for a plurality of files from the first client device during the synchronization session;
characterizing a subset of the plurality of files as having been damaged by the malware; and
automatically restoring only the subset of the plurality of files.

20. A computer readable medium including instructions stored therein which, when executed by a processor, cause the processor to perform operations comprising:
receive, at a remote cloud service, from a first client device over a communication network during a synchronization session, synchronization data for a first file indicating that a first client device is associated with a likelihood of infection by malware;
determine, at the remote cloud service, in response to receiving the synchronization data, that the first client device has been infected by malware;
access first user account information associated with the first client device to identify remediation actions approved to be automatically invoked on the first client device responsive to determining that the first client device has been infected by malware;

automatically invoke, on the first client device, the remediation actions that have been approved to be invoked automatically for remediation of the first client device;

confirm, at the remote cloud service, that the remediation of the first client device has successfully concluded;

determine an initial infection time, based on a review of a synchronization history of the first file, when an infected version of the first file was initially submitted for synchronization with the remote cloud service;

automatically restore the first file on the first client device by identifying, at the remote cloud service, a first version of the first file synced prior to the initial infection time and replacing the infected version with the first version;

automatically identify a second client device associated with the first user account information that did not access the first file;

determine that the second client device has been infected by the malware; and automatically invoke the remediation actions approved to be invoked automatically for remediation of the second client device responsive to determining that the second client device has been infected by the malware.

* * * * *